(12) United States Patent  
Cao et al.

(10) Patent No.: US 11,452,078 B2  
(45) Date of Patent: Sep. 20, 2022

(54) METHOD AND APPARATUS FOR SIDELINK TRANSMISSION AND RESOURCE ALLOCATION

(71) Applicant: Huawei Technologies Co., Ltd., Shenzhen (CN)

(72) Inventors: Yu Cao, Kanata (CA); Amine Maaref, Ottawa (CA); Jianglei Ma, Ottawa (CA); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 16/796,067

(22) Filed: Feb. 20, 2020

(65) Prior Publication Data

US 2020/0275425 A1 Aug. 27, 2020

Related U.S. Application Data

(60) Provisional application No. 62/809,478, filed on Feb. 22, 2019.

(51) Int. Cl.
*H04W 72/04* (2009.01)
*H04L 1/00* (2006.01)
(Continued)

(52) U.S. Cl.
CPC ....... *H04W 72/0406* (2013.01); *H04L 1/0003* (2013.01); *H04L 5/0053* (2013.01); *H04W 4/44* (2018.02); *H04W 4/46* (2018.02)

(58) Field of Classification Search
CPC ..... H04W 72/0406; H04W 4/46; H04W 4/44; H04W 74/0816; H04W 72/02;
(Continued)

(56) References Cited

U.S. PATENT DOCUMENTS 10,652,919 B1 * 5/2020 Li ....................... H04L 1/1887  
2018/0014345 A1 1/2018 Sartori et al.  
(Continued)

FOREIGN PATENT DOCUMENTS

CN 106304351 A 1/2017  
CN 106304360 A 1/2017  
(Continued)

OTHER PUBLICATIONS

MCC Support; Final Report of 3GPP TSG RAN WG1 #95 v1.0.0, (Spokane, USA, Nov. 12-16, 2018); 3GPP TSG RAN WG1 meeting #96, Athens, Greece, Feb. 25-Mar. 1, 2019 R1-1901482, 172 pgs.

(Continued)

*Primary Examiner* — Ajit Patel  
*Assistant Examiner* — Wilfred Thomas  
(74) *Attorney, Agent, or Firm* — Slater Matsil, LLP

(57) ABSTRACT

Method and devices are provided for wireless communication. A method involves obtaining, by a receive user equipment (UE), configuration information relating to a sidelink transmission between the first UE and a second UE, the configuration information for indicating to the first UE that the sidelink transmission is not associated with any corresponding sidelink control information (SCI). A further step involves receiving, by the receive UE, the sidelink transmission from the second UE using time and frequency resources indicated by the configuration information. Another method involves obtaining, by a transmit UE, configuration information relating to a sidelink transmission between the first UE and a second UE, the configuration information for indicating to the first UE that the sidelink transmission is not associated with any corresponding SCI and transmitting, by the first UE, the sidelink transmission to the second UE using time and frequency resources indicated by the configuration information.

27 Claims, 16 Drawing Sheets

(51) Int. Cl.
*H04L 5/00* (2006.01)
*H04W 4/44* (2018.01)
*H04W 4/46* (2018.01)

(58) Field of Classification Search
CPC ........ H04W 4/08; H04W 4/40; H04L 5/0053; H04L 1/0003; H04L 5/0044; H04L 5/0033; H04L 5/0091; H04L 5/0012; H04L 5/0026; H04L 5/0048; H04L 5/14; H04L 1/0023
See application file for complete search history.

(56) References Cited

U.S. PATENT DOCUMENTS

| | | | |
|---|---|---|---|
| 2019/0174530 A1* | 6/2019 | Kim | H04L 1/0025 |
| 2019/0182644 A1 | 6/2019 | Zheng et al. | |
| 2019/0200355 A1* | 6/2019 | Baldemair | H04W 72/0453 |
| 2019/0306912 A1* | 10/2019 | Cheng | H04W 76/11 |
| 2019/0342910 A1 | 11/2019 | Cao et al. | |
| 2020/0236656 A1 | 7/2020 | Cao et al. | |
| 2020/0236666 A1* | 7/2020 | Yu | H04W 72/0446 |
| 2020/0288433 A1* | 9/2020 | Yu | H04W 72/10 |
| 2020/0295810 A1* | 9/2020 | Baldemair | H04L 1/1822 |
| 2020/0322923 A1* | 10/2020 | Yasukawa | H04W 4/44 |
| 2020/0374031 A1* | 11/2020 | Baldemair | H04L 1/003 |
| 2021/0058207 A1* | 2/2021 | Lee | H04L 5/0053 |
| 2021/0143963 A1 | 5/2021 | Matsuda et al. | |

FOREIGN PATENT DOCUMENTS

| | | |
|---|---|---|
| CN | 106797635 A | 5/2017 |
| WO | 2018031519 A1 | 2/2018 |

OTHER PUBLICATIONS

RAN1 Chairmans' Notes; 3GPP TSG RAN WG1 Meeting Ad-Hoc Meeting 1901, Taipei, Taiwan, Jan. 21-25, 2019, 82 pgs.

* cited by examiner

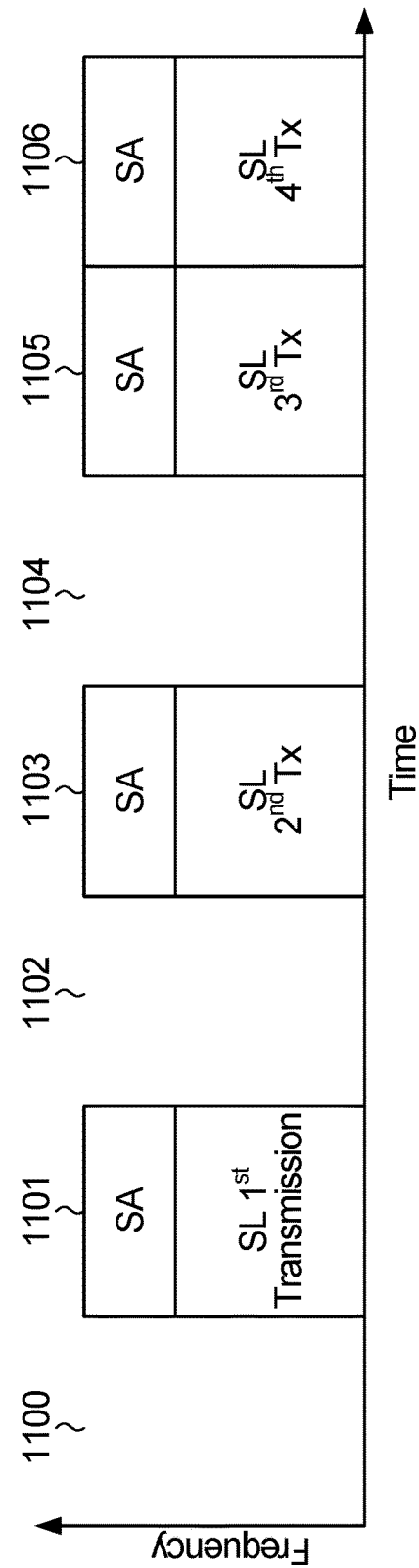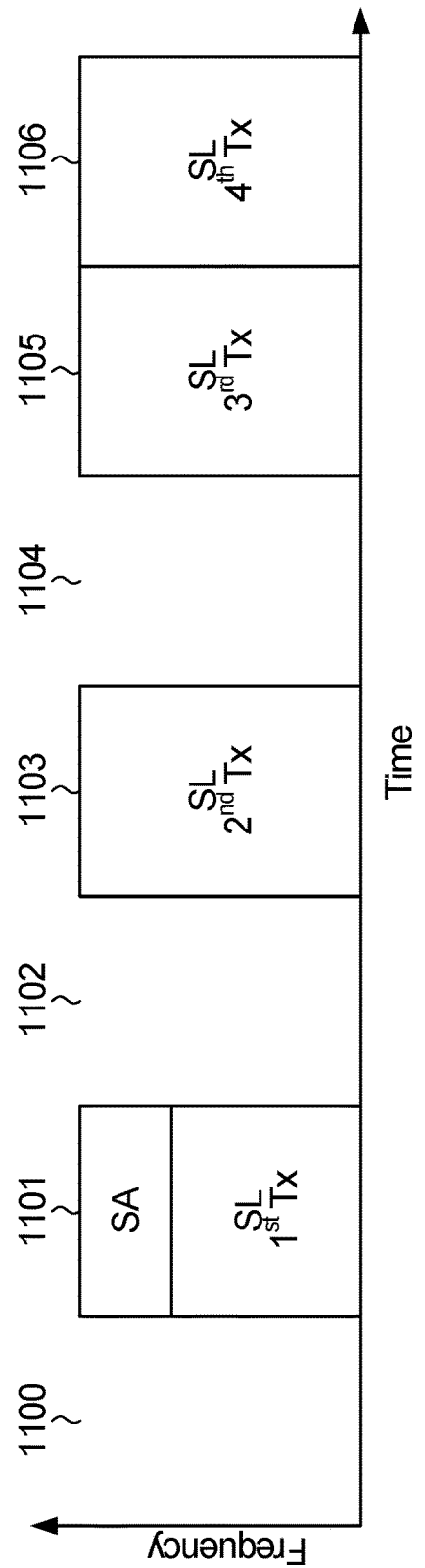

| Index for 3-tuple | {P1} Initial | {P2} 1reT | {P3} 1reT |
|---|---|---|---|
| 1 | P11 | P21 | P31 |
| 2 | P12 | P22 | P32 |
| 3 | P13 | P23 | P33 |

FIG. 8

METHOD AND APPARATUS FOR SIDELINK TRANSMISSION AND RESOURCE ALLOCATION

RELATED APPLICATIONS

This application claims the benefit of priority of U.S. Provisional Patent Application 62/809,478 filed on Feb. 22, 2019, which is hereby incorporated by reference in its entirety.

FIELD

The application relates to methods and apparatus for sidelink transmission and resource allocation.

BACKGROUND

LTE V2X:

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In V2X, the transmission can be done through a link between network and UE, such as uplink (UL) and downlink (DL) or a sidelink (SL) between UE and UE. UE cooperation can be used to enhance the reliability, throughput, and capacity of V2X communications, as well as next generation wireless communications in general.

In Long Term Evolution (LTE), a conventional V2X transmission scheme relies on the concept of a transmit resource pool (RP). The conventional LTE V2X transmission scheme includes two transmission modes: mode 3 and mode 4. In mode 3, a base station (BS) schedules time-frequency resources (from the UE's RP) for SL transmission using downlink control information (DCI), either dynamically or semi-persistently. In mode 4, UE randomly selects resources within its transmit RP. A UE may also reselect resources based on previous measurement and sensing results.

The conventional resource pool approach has downsides and limitations. For example, the scheduling in mode 3 results in scheduling-related limitations, such as latency and having the SL transmission rely on DCI. For another example, when the UE autonomously selects resources in mode 4, there can be a collision or conflict with the same resource being selected by another UE.

A known form of UL grant-free (GF) transmission is called "configured grant UL transmission" or "UL transmission without dynamic scheduling." UL GF includes two types of GF transmission, Type 1 and Type 2. For configured grant Type 1, a resource is configured by radio resource control (RRC) signaling. For configured grant Type 2, a resource is configured by a combination of RRC signaling and DCI signaling. "New Radio" (NR) UL configured grant Type 1 transmission is mainly used for uplink transmission, which means the base station that configured the resource is also the receiver. Therefore, the receiver (the BS) knows all the possible configurations of the configured grant UE.

SUMMARY

According to a first aspect of the disclosure, there is provided a method for wireless communication, the method involving a first user equipment (UE) receiving configuration information, the configuration information including a plurality of sets of configuration parameters for sidelink (SL) data transmission with at least one other UE, each set of configuration parameters having a corresponding configuration index. The method further involving the first UE transmitting sidelink control information (SCI) used for indicating transmission resource information for scheduling a SL data transmission from the first UE to a second UE, wherein the SCI includes a configuration index associated with a set of configuration parameters of the plurality of sets of configuration parameters and the first UE transmitting the SL data transmission to the second UE.

In some embodiments, transmitting the SL data transmission to the second UE further includes transmitting the SL data transmission according to the set of configuration parameters associated with the configuration index.

In some embodiments, each set of configuration parameters associated with the configuration index includes: a time resource information; a frequency resource information; and wherein transmitting the SL data transmission to the second UE further includes transmitting the SL data according to the time and frequency resource information.

In some embodiments, each set of configuration parameters includes one or more of: a transmission pattern or a pool of transmission patterns; a demodulation reference signal (DMRS) or a pool of DMRSs; a modulation and coding sequence (MCS) or a pool of MCSs; a redundancy version (RV) sequence or a pool or RVs; a destination identifier (ID); a source ID; a hybrid automatic repeat request (HARQ) process ID; and a new data indicator (NDI).

In some embodiments, the method further involving the first UE transmitting to a third UE for sensing, the SCI used for indicating the transmission resource information for scheduling the SL data transmission from the first UE to the second UE.

In some embodiments, the method further involving the first UE selecting the set of configuration parameters from the plurality of sets of configuration parameters for indicating the transmission resource information for scheduling the SL data transmission from the first UE to the second UE.

According to a second aspect of the disclosure, there is provided a user equipment (UE) for wireless communication, the UE including a processor and a computer-readable medium having stored thereon computer-executable instructions. The computer-executable instructions, when executed by the processor, cause the UE to: receive configuration information, the configuration information including a plurality of sets of configuration parameters for sidelink (SL) data transmission with at least one other UE, each set of configuration parameters having a corresponding configuration index; transmit sidelink control information (SCI) used for indicating transmission resource information for scheduling a SL data transmission from the UE to a second UE, wherein the SCI includes a configuration index associated with a set of configuration parameters of the plurality of sets of configuration parameters; and transmit the SL data transmission to the second UE.

In some embodiments, the computer executable instructions that transmit the SL data transmission to the second UE cause the first UE to transmit the SL data transmission according to the set of configuration parameters associated with the configuration index.

In some embodiments, each set of configuration parameters associated with the configuration index includes: a time resource information; a frequency resource information; and wherein transmitting the SL data transmission to the second UE further includes transmitting the SL data according to the time and frequency resource information.

In some embodiments, each set of configuration parameters includes one or more of: a transmission pattern or a pool of transmission patterns; a demodulation reference signal (DMRS) or a pool of DMRSs; a modulation and coding sequence (MCS) or a pool of MCSs; a redundancy version (RV) sequence or a pool or RVs; a destination identifier (ID); a source ID; a hybrid automatic repeat request (HARQ) process ID; and a new data indicator (NDI).

In some embodiments, the computer executable instructions further include instructions that when executed cause the UE to transmit to a third UE for sensing, the SCI used for indicating the transmission resource information for scheduling the SL data transmission from the UE to the second UE.

In some embodiments, the computer executable instructions further include instructions that when executed cause the UE to select the set of configuration parameters from the plurality of sets of configuration parameters for indicating the transmission resource information for scheduling the SL data transmission from the UE to the second UE.

According to a third aspect of the disclosure, there is provided a method for wireless communication, the method involving a first user equipment (UE) receiving configuration information, the configuration information including a plurality of sets of configuration parameters for sidelink (SL) data transmission between at least two UEs, each set of configuration information having a corresponding configuration index. The method further includes the first user equipment (UE) receiving sidelink control information (SCI) used for indicating transmission resource information for scheduling a SL data transmission from a second UE, wherein the SCI includes a configuration index associated with a set of configuration parameters of the plurality of sets of configuration parameters; the first UE decoding the SCI; and the first UE determining a location in the transmission resource where the data transmission is transmitted by the second UE based on the decoded the SCI.

In some embodiments, determining the location in the transmission resource where the data transmission is transmitted by the second UE based on the decoded SCI includes determining the location according to the set of configuration parameters associated with the configuration index.

In some embodiments, each set of configuration parameters associated with the configuration index includes: a time resource information; a frequency resource information; and wherein transmitting the SL data transmission to the second UE further includes transmitting the SL data according to the time and frequency resource information.

In some embodiments, each set of configuration parameters includes one or more of: a transmission pattern or a pool of transmission patterns; a demodulation reference signal (DMRS) or a pool of DMRSs; a modulation and coding sequence (MCS) or a pool of MCSs; a redundancy version (RV) sequence or a pool of RVs; a destination identifier (ID); a source ID; a hybrid automatic repeat request (HARQ) process ID; and a new data indicator (NDI).

In some embodiments, the method further involving, when the first UE determines the data transmission is intended for the first UE, the first UE decoding the data transmission received from the second UE based on information in the decoded SCI.

In some embodiments, the method further involving, selecting a transmission resource different than the transmission resource identified by the decoded SCI for communication between the first UE and a third UE.

According to a fourth aspect of the disclosure, there is provided a user equipment (UE) for wireless communication, the UE including a processor and a computer-readable medium having stored thereon computer-executable instructions. The computer-executable instructions, when executed by the processor, cause the UE to: receive configuration information, the configuration information including a plurality of sets of configuration parameters for sidelink (SL) data transmission between at least two UEs, each set of configuration information having a corresponding configuration index; receive sidelink control information (SCI) used for indicating transmission resource information for scheduling a SL data transmission from a second UE, wherein the SCI includes a configuration index associated with a set of configuration parameters of the plurality of sets of configuration parameters; decode the SCI; and determine a location in the transmission resource where the data transmission is transmitted by the second UE based on the decoded the SCI.

In some embodiments, the computer executable instructions that determine the location in the transmission resource where the data transmission is transmitted by the second UE based on the decoded the SCI include instructions to determine the location according to the set of configuration parameters associated with the configuration index.

In some embodiments, each set of configuration parameters associated with the configuration index includes: a time resource information; a frequency resource information; and wherein transmitting the SL data transmission to the second UE further includes transmitting the SL data according to the time and frequency resource information.

In some embodiments, each set of configuration parameters includes one or more of: a transmission pattern or a pool of transmission patterns; a demodulation reference signal (DMRS) or a pool of DMRSs; a modulation and coding sequence (MCS) or a pool of MCSs; a redundancy version (RV) sequence or a pool of RVs; a destination identifier (ID); a source ID; a hybrid automatic repeat request (HARQ) process ID; and a new data indicator (NDI).

In some embodiments, the computer executable instructions further include instructions that when executed cause the UE to, when the UE determines the data transmission is intended for the UE, decode the data transmission received from the second UE based on the decoded SCI.

In some embodiments, the computer executable instructions further include instructions that when executed cause the UE to select a transmission resource different than that identified by the decoded SCI for a transmission resource for communication between the UE and a third UE.

BRIEF DESCRIPTION OF THE DRAWINGS

Embodiments of the disclosure will now be described with reference to the attached drawings in which:

FIG. 2A is a plot illustrating an example of a configuration of an SA;

FIG. 2B is another plot illustrating an example of a configuration of a scheduling assignment (SA);

FIG. 8 is an example of DMRS tuple associated with retransmission;

DETAILED DESCRIPTION

Figure 1A:
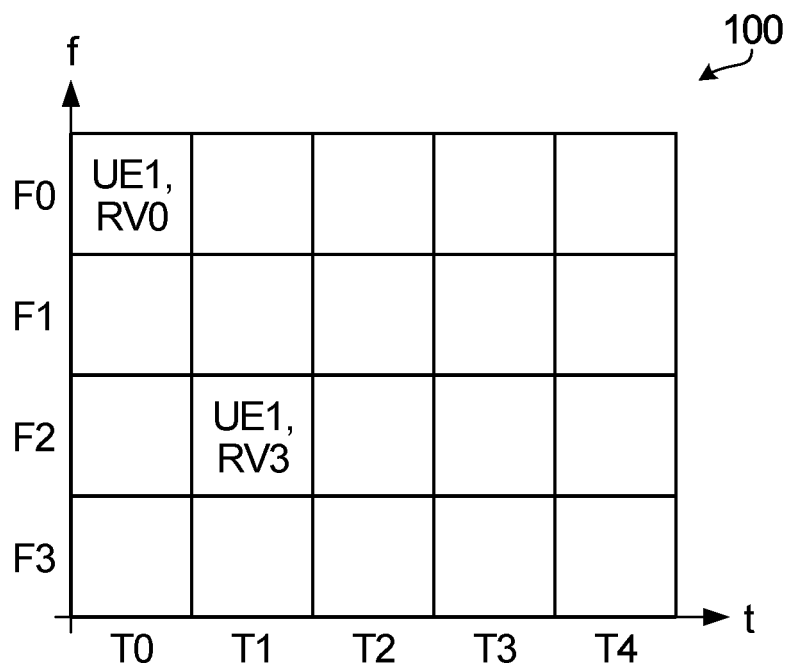
FIG. 1A is a block diagram illustrating an example of a two-dimensional resource configuration for grant-free SL transmission.

In V2X SL, both the transmitter and receiver are UEs, therefore, the receiver would not be able to know the transmitter UE's configurations, such as which UE is transmitting, which UE is the data a target for, what is the time/frequency resource used for the transmission and the control information, etc.

In SL GF transmission, there is no dynamic signaling needed for SL transmission. In this case, sidelink control information (SCI) does not need to include scheduling information, such as time/frequency domain resources, modulation and coding scheme (MCS), etc. In some SL transmission mechanisms, a UE always first decodes the SCI, and then uses the information included in the SCI to decode the SL data transmission. A problem that may arise is how does the UE decode the SL transmission if the SCI does not include the scheduling information. There may even be scenarios where a transmitter UE communicating with a receive UE has an opportunity to use an SCI or not use an SCI and the receive UE can attempt to determine whether an SCI has been used or not based on how the receive UE is configured. For example, if the receive UE is configured for configured grant, or with a transmission pattern, or from a modulation and coding scheme pool or a demodulation reference signal (DMRS) pool or an association of parameters, the receive UE may assume that there is no SCI transmitted by the transmit UE together with a data transmission.

In NR, there are two SL transmission modes, Mode 1 and Mode 2. In Mode 1, the BS controls SL transmission. In Mode 2, the UE determines or selects a resource from among a resource pool. Mode 1 may include a dynamic scheduling mode, such as Configured grant Type 1 and Configured grant Type 2. Configured grant Type 1 is a type of grant-free transmission. All the methods described in this disclosure that are applied to GF transmission can be applied to configured grant transmission.

In Mode 1 GF transmission mode, a GF resource is configured by RRC signaling (or RRC configured grant, or configured grant Type 1) with dynamic grant or dynamic scheduling from the BS. The UE uses the configured resource without dynamic signaling (e.g. DCI) to perform a SL transmission. Mode 1 is most suitable for an "in coverage" UE. In Mode 2 GF transmission, the GF resource may be preconfigured or configured by RRC or system information. Mode 2 GF can also be known as Mode 2 configured grant transmission. Mode 2 GF can be used for both "in coverage" and "out of coverage" UEs. For out of coverage operation, Mode 2 GF transmission assumes (pre)-configuration of single or multiple sidelink transmission patterns (patterns are defined on each sidelink resource pool). For in-coverage operation, Mode 2 GF assumes that BS configuration indicates single or multiple sidelink transmission patterns (patterns are defined in each sidelink resource pool). If a single pattern is configured to a transmitting UE there is no sensing procedure executed by the UE. If multiple patterns are configured to the transmitting UE there is a possibility of a sensing procedure being executed by the UE. Patterns are defined in terms of a size of the resource in time and frequency, position(s) of the resource in time and number of resources.

Methods of configuring resources for GF transmission are provided by some embodiments of the disclosure. These methods may be applied to GF transmission or GF transmission mode in SL Mode 1 and/or Mode 2. These methods may be also applied to configured grant transmission in SL Mode 1 and/or Mode 2. Alternatively, these methods may be applied to SL transmission in general, not limited to SL GF transmission in Mode 1 and/or Mode 2.

In some embodiments of the present disclosure, when it is determined that no SCI is transmitted from a first UE to a second UE, the time/frequency resources and other transmission parameters, such as MCS, are not included in the SCI. Rather, the UE may rely on other semi-static configurations or blind detection to obtain the transmission parameters and decode the data. The UE does not rely on any dynamic scheduling information to indicate a transmission resource. The UE also does not rely on the SCI for time/frequency resource parameters, MCS and other parameters related to scheduling.

Generally, sidelink GF resource configuration involves the configuration of one or more parameters for sidelink GF transmission or reception. This can involve the use of (selection from within and/or configuration of) pools to define possible values for individual parameters or sets of parameters.

GF resource configuration may be performed on a UE specific basis, where the configuration is applicable to a specific UE, or on a group common basis, where the configuration is applicable to multiple UEs.

In some embodiments, GF resource configuration involves the use of (UE specific or group common) radio resource control (RRC) signaling. In some embodiments, GF resource configuration involves the use of system information, transmitted in system information blocks (SIBs), that is defined to be common for all UEs.

In some embodiments, GF resource configuration of one or more parameters for GF transmission or reception involves configuring one or more parameters for use while a UE is within network coverage.

In some embodiments, GF resource configuration of one or more parameters for GF transmission or reception involves preconfiguring one or more parameters for use by a UE which can be used when a UE goes out of network coverage. Preconfiguration may involve preconfiguration without signaling from the BS or preconfiguration using BS signaling while in-coverage, which may be kept and used for out-of-coverage operation, the latter including UE-specific preconfiguration for example via RRC signaling, or a common preconfiguration, for example via system information.

In some embodiments, the preconfigured SL configuration comprises any one of the following: an SL configuration preconfigured in the UE prior to deployment of the UE; an SL configuration preconfigured in the UE other than by higher-layer signaling; an SL configuration preconfigured in the UE by a network entity in the communication network prior to the UE becoming out of coverage; an SL configuration forwarded to the UE directly by another UE; and a common or initial SL configuration preconfigured in the UE. The following are examples of possible ways to preconfigure the SL resources:

First Example: the SL resources are preconfigured in the UE by the manufacturer.

Second Example: The SL resources are preconfigured/reconfigured by a V2X control entity.

Third Example: The SL resources are preconfigured by the BS using higher-layer signaling. The UE uses the preconfigured SL resource(s)/resource pool(s) after transitioning from in-coverage to out-of-coverage. The higher-layer signaling can be cell-specific (e.g. System Information Block type X (SIBx)) or UE-specific.

Fourth Example: A UE (UE A) may receive pre-configuration information from another UE (UE B) through a SL transmission. UE B may receive the pre-configuration information from a BS (through UE-specific or cell-specific signaling) or from another UE (UE C);

Fifth Example: A common/initial SL resource/resource pool(s) is configured in SIBx. A UE keeps the initial/common SL resource/resource pool(s) when transitioning from in-coverage to out-of-coverage. The UE uses the common/initial SL resource/resource pool(s) as the preconfigured SL resource/resource pool(s) after transitioning from in-coverage to out-of-coverage.

In some embodiments, a GF resource configuration involves indicating a resource from a resource pool that is configured or preconfigured. Alternatively, GF resource configuration involves configuring a resource pool from which the UE can select from. The resource pool configuration may also be used to define a resource pool for other transmission modes or just an independent GF resource configuration.

A resource pool (RP) refers to a pool of transmission resources that a UE can use or select from. A resource pool typically includes at least the time and frequency resources. The resource pool can include other transmission resources.

In one example, there are multiple resource pool configurations, which may be configured per SL bandwidth part (BWP). Each resource pool may be a transmit resource pool or a receive resource pool. For each RP, there may be a GF configuration defined within the RP, there may be other transmission modes defined within the RP as well. In another example, there are multiple GF resource configurations, which may be configured per SL BWP. For each GF configuration, there may be one or multiple resource pools defined, each resource pool can be a transmit resource pool or receive resource pool. In some scenarios, the resource configuration for each GF configuration may not be called a resource pool or be from within a resource pool, it may be simply a resource configuration.

In some embodiments, a UE is configured with multiple GF resource configurations, which may be defined within multiple SL bandwidth parts (BWPs). SL BWPs may be configured within RRC configuration (UE specific SL BWP), in system information (common SL BWP) or pre-configuration (preconfigured SL BWP). In some embodiments, a UE reuses one or more UL BWPs as SL BWPs.

In some embodiments, a UE may have multiple resource pool configurations and/or multiple GF resource configurations. Multiple transmit and receive resource pool configurations and/or multiple GF resource configurations may be configured per SL-BWP.

In some embodiments, multiple GF resource configurations may be configured within resource pool configurations.

In some embodiments, multiple transmit and receive resource pools may be configured within GF resource configurations.

In some embodiments, multiple GF resource configurations may be independent of resource pool configurations.

Each GF configuration may include one or more of a transmit resource or resource pool and a receive resource or resource pool. The configuration can be semi-static or semi-persistently configured. An example of configuration signaling can include RRC, system information block (SIB), preconfigured, or a combination of RRC and SIB.

Each GF resource configuration may include parameters for one or multiple transmit GF resource configurations and/or parameters for one or multiple receive GF resource configurations. Parameters for each transmit GF resource configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, demodulation reference signal (DMRS) or DMRS pool, repetition K, hybrid automatic repeat request (HARQ) process related parameters, feedback channel parameters and optionally destination ID or destination group ID.

Parameters for each receive GF resource configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, DMRS or DMRS pool, repetition K, HARQ process related parameters, feedback channel parameters and optionally source ID or source group ID.

The time domain resource configuration may include optionally a periodicity, optionally an offset (also referred to as starting slot), transmission pattern, repetition number (K), redundancy version (RV) sequence for repetition, and optionally length of the transmission pattern, etc.

A transmission pattern in the time domain may be indicated using a bitmap indicating which time slot can be used for the UE to transmit SL data.

The frequency domain resource configuration may include, for example, the active Bandwidth part (BWP) used for SL transmission and subchannels/Resource block group (RBG) of the BWP. In some embodiments, the frequency domain configuration may first indicate a starting resource block (RB) of a first frequency sub-channel (RB_{start}), a number of RBs per frequency subchannel (N_{RB_in_subchannel}), and a total number of frequency sub-channels (n_{subchannel}) available for the SL transmission. The above parameters can be used to determine the range and partition of frequency subchannels. For example, in a resource grid as shown in FIG. 1A described in detail below, the above parameters (starting RB of F0, number of frequency sub-channels is 4 and the number of RBs per sub-channel is the number of RBs in F0) can define the frequency location and size for F0 to F4. The above parameters can be UE specifically indicated (e.g. in RRC) or can be broadcast in system information for multiple UEs. The frequency domain configuration may then indicate the index of the frequency subchannel m to be used for the transmission. The UE may then determine its frequency allocation corresponds to the RB that starts at RB index RB_{start}+ m*N_{RB_in_subchannel} and with n_{subchannel} number of continuous RBs to be used. In such a case, a transmission pattern bitmap is determined in the time domain and different subchannels may be used in the frequency domain for different repetitions of the transmission block (TB), the frequency domain configuration may further indicate the frequency index for each transmission/repetition of the TB. For example, in case of the example shown in FIG. 1A, F0 to F4 may correspond to index m as 0, 1, 2, 3, respectively, and the frequency domain resource configuration may indicate a frequency channel index sequence corresponding to each transmission of the TB, which is {0, 2}, corresponding to F0 and F2 for first and second transmissions of the TB. In some embodiments, the resource assigned to each physical sidelink shared channel (PSSCH) transmission may include more than 1 subchannel in the frequency domain. In this scenario, in addition to indicating the above definition of subchannel, the resource configuration may further include the starting subchannel index and the number of subchannels used for each PSSCH transmission. The starting subchannel index and the number of subchannels used can be individually defined for each repetition. Alternatively, the number of subchannels used for each repetition may be the same and only the starting subchannel index need to be signaled for each repetition. In another embodiment, the starting subchannel index may be defined for just the initial transmission, the starting subchannel index for the rest of the repetition can be the same as the initial transmission or determined by the starting subchannel index along with frequency hopping parameters or through frequency domain pattern indication.

If the SL control channel is defined, the time and frequency domain resource configuration for the physical sidelink control channel (PSCCH), or scheduling assignment (SA), may share the same above configuration for the SL data channel or have their own separate configuration. In some embodiments, the resource configuration for an SA shares the parameters above with the data channel configuration, but has the following additional configurations, which may include starting symbol and length of a SA in terms of number of symbols, a time gap between SA and the corresponding data transmissions if SA and data transmission are in different slots (see, for example, FIGS. 2A and 2B described below), and the frequency-domain resource configuration of SA. For example, the frequency domain resource configuration of SA may include a starting frequency domain communication resource and a size of a SA in the frequency domain (e.g. in terms of resource blocks, the starting RB and the size of SA in number of RBs). There may be a parameter used to indicate whether the SA and data is in a frequency division duplex (FDD) mode or time division duplex (TDD) mode and/or whether the SA and data are in different slots.

FIG. 2A is a plot illustrating an example of a configuration of an SA. FIG. 2A illustrates time slots 1100-1106 on a time-frequency resource grid. During four of those time slots 1101, 1103, 1105 and 1106, an SA transmission and an SL data transmission are performed. These transmissions may be performed, for example, in accordance with a transmission pattern.

In FIG. 2A, an SA is associated with each of the four SL transmissions in the time slots 1101, 1103, 1105 and 1106, which corresponds to a transmission pattern bitmap {0101011} that is used as an example above. Each SA may indicate the transmission pattern and resources used for each SL data transmission of time slots 1101, 1103, 1105 and 1106 (may include both time domain and frequency domain configuration described earlier). An SA may also include the number of transmissions, and the redundancy version (RV) sequence associated with the transmissions. Each SA may also indicate the starting location of the transmission pattern or the time location of the transmission associated with this SA (the indication can be actual time location or relative time location to the SA). In the case of an SA and its associated SL transmission being frequency division duplexed (FDDed) as in FIG. 2A or otherwise combined in the same time unit, the time location of the associated SL transmission may be derived from the time location of the SA. Additionally, the SAs may indicate other information associated with the transmissions of SL data such as the RV for each SL transmission and/or the RV for its associated transmission. An SA may also indicate which transmission of the TB and/or RV for this transmission. For example, the SA in slot 1101 may indicate that this is the first transmission of the TB and it may also indicate the RV that is associated with this TB. Alternatively, each SA may only include the transmission pattern and resources used for the SL transmission for the associated transmission. For example, the SA transmission associated with time slot 1101 may only include the parameters used for the SL data transmission in that particular time slot 1101.

FIG. 2B is another plot illustrating an example of a configuration of an SA. FIG. 2B illustrates the same time slots as FIG. 2A. However, an SA transmission is performed only in time slot 1101, and is associated with all transmissions in the transmission pattern. Therefore, the SA transmitted during time slot 1101 in FIG. 2B includes the transmission pattern and resources used for each SL data transmission in time slots 1101, 1103, 1105 and 1106 (may include both time domain and frequency domain configuration described earlier). An SA may also include the number of transmissions for the TB, and the RV sequence associated with the transmissions. The SA may also indicate the starting time location of the transmission pattern or the starting time location of the initial transmission of the TB. In some embodiments, an SA may use its own time location as reference and only include a time gap between the SA and the corresponding data transmission (initial transmission of a TB, the starting location of the transmission pattern or the data transmission associated with the SA) instead. In the case of SA and its associated SL transmission being FDDed as in FIG. 2B or otherwise combined in the same time unit, the time location of the associated SL transmissions may be derived from the time location of the SA.

In FIGS. 2A and 2B, the SA and SL data transmissions are separated using frequency division duplex (FDD). In such a scenario, the time locations of an SA may not need to be explicitly configured by the BS in the example SL transmission modes described herein, as the time location of an SA can be derived from the time location of its associated SL data transmission/transmissions. However, in general, the SA and SL data transmissions may be separated using other configurations, such as time division duplex (TDD). In the case of TDD, an SA may include a time gap between the time location of the SA and the time location of its associated SL data transmission (in a configuration of FIG. 2A) or the SA may include a time gap between the time location of SA and the time location of the initial SL data transmission or the transmission pattern of its associated data transmissions of the TB (in a configuration of FIG. 2B). Similarly, in the case of TDD, when configuring the SA resource, the BS may indicate a similar time gap between the SA and its associated data transmission such that a UE can derive the time resource used for SA given the time resource configured for the data transmission.

For the SA in the configurations of FIGS. 2A and 2B or an SA in general, the SA may indicate the time and frequency resources used for each SL transmission of the TB.

Time frequency resources may include the number of sub-channels used for each SL data or PSSCH transmission (which may be referred to as a PSSCH partition). The definition of sub-channel may include size of subchannel (e.g. in resource blocks), and/or number of subchannels in frequency domain. The location of sidelink control channel (SCI) can be signaled in different methods. In some embodiments, the pool of all SCI locations (also named PSCCH pool) may be defined first in the resource pool and then the exact location of the SCI can be further defined in the GF resource configuration. In one example, if the PSCCH is not transmitted in adjacent RBs with PSSCH, the PSCCH pool is a separate region in the frequency domain next to the frequency subchannels used for data transmission. Each SCI corresponding to each data frequency channel is equal in size. Therefore, once the PSCCH pool is defined, e.g. through signaling the starting RB of a PSCCH pool and the number of RBs used for the SCI in the frequency domain, the UE can derive the location of the SCI. In some embodiments, the number of RBs used in the SCI is predetermined without signaling. In another scenario, the SCI is always at a fixed location with respect to the PSSCH transmission (e.g. 2 RBs for each slot transmission next to the PSSCH transmission). In both cases, a UE will be able to know where to detect the SCI, either based on some default rule, or through configuration. Periodicity indicates the time duration between two neighboring GF resources or resource bundles that repeat over time. Here a resource bundle refers to multiple PSSCH resources defined in a pattern. In some embodiments, the pattern is used for multiple repetitions of a TB. Some embodiments may allow the use of the resource pattern for transmission of different TBs. The pattern window length is the time domain length of which each transmission pattern is defined within.

Figure 3:
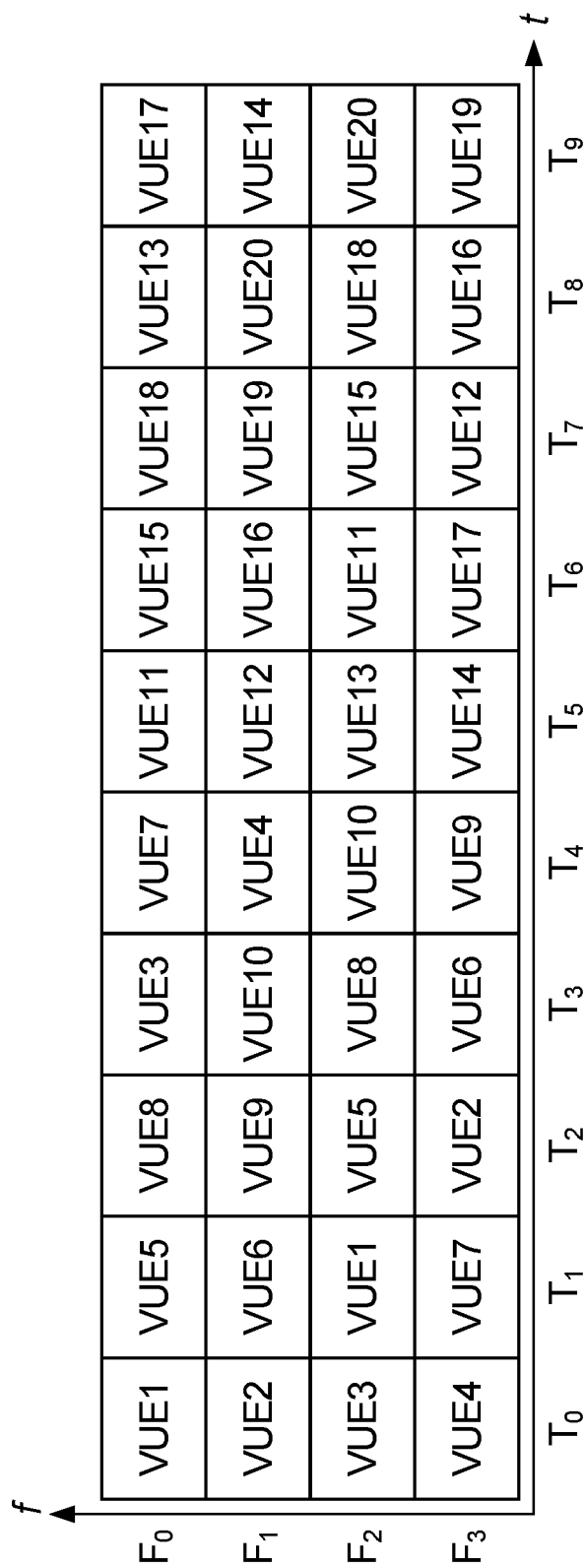
FIG. 3 is a specific example of time frequency parameters, definition of subchannnels, transmit pattern, etc.

FIG. 3 shows a specific example of time/frequency parameters, definition of subchannnels, transmit pattern, etc. For this example, time is on the horizontal axis and frequency is on the vertical axis. Frequency is divided into four segments; each division is the frequency partition for one PSSCH transmission in the frequency domain, which may be one or multiple resource blocks. Each frequency partition may be one subchannnel or multiple subchannels. The number of RBs and starting RBs for each frequency subchannel may be determined from the resource configuration or definition of resource pool or pattern pool. The number of subchannels used for each PSSCH transmission in the frequency domain in the case when multiple subchannels can be used may also be signaled in the resource configuration. Time is shown divided into ten time units; each division is the size of a PSSCH transmission in the time domain, and may be one or multiple orthogonal frequency division multiplexed (OFDM) symbols. Each division can be a slot. A transmit pattern is made up of multiple blocks of time frequency resources. For example, the pattern labelled VUE1 has a block in F0, T0, and another block in F2, T1. Shown are 19 patterns within the depicted resource. Note that in FIG. 3, T0 to T4 shows a pattern window, within which the non-overlap pattern of VUE 1 to VUE 10 is defined. 10 new patterns for another different 10 UEs (VUE11-VUE20) are defined in T5-T9, which is a repetition of the 10 patterns defined in T0-T4. The 20 patterns defined within the pattern grid shown in the figure may be repeated over time for VUE1 to VUE 20, i.e., VUE1 to VUE20 may be configured in a new pattern of two resources every 10 time units. Using 1 time unit (T0) equal to 1 slot as an example, in the example pattern pool defined in FIG. 3, the pattern window length=5 slots and periodicity=10 slots.

The Reference signal (RS) may include, but is not limited to:
a. PSSCH/DMRS mapping type. Type A may indicate the DMRS location is at fixed symbols among the slot. Type B may indicate the DMRS symbol location depends on the starting and ending symbol configuration of the data resource.
b. DMRS location and symbols. Which may indicate how many DMRS symbols are used and location of DMRS symbols.
c. DMRS sequence initialization;
d. Antenna port;
e. number of layers;

A pool of DMRS means all the possible DMRS parameters that can be used for the UE. The definition of all the configuration parameters may be used throughout the disclosure.

In some embodiments, there is no SCI associated with the PSSCH transmission, and the SCI need not be transmitted at all. In some other embodiments, the SCI may be defined and transmitted with SL data transmission, but does not include dynamic scheduling information. Details of these options are described among the different examples presented below.

Example 1: Configure Transmission Parameters for Both Transmitter and Receiver UE in SL For unicast/multicast/groupcast/broadcast transmission, the network may set up a UE pair (including a transmit UE and a receive UE for unicast transmission) or a UE group (that includes a transmit UE and a receive UE group for multicast transmission or includes a transmit UE group and a receive UE group for groupcast transmission) first.

In this case, there may be a link established between the transmit UE or UE group with the receive UE or UE group before transmission. In an example of establishing the link, the network signals the destination ID or IDs or destination ID group to the transmit UE or transmit UE group and the network may signal the source ID or IDs or source ID group to the receive UE or receive UE group for the transmission. In another example of how to establish the link, the transmit UE sends a discovery signal to find receive UEs that are within reach of the signal. The UE or UEs or UE group that receives the discovery signal may send a signal to the BS and/or the transmit UE to confirm the reception. The BS may then send another confirmation signal to the transmit UE and optionally to the receive UE as well to inform the establishment of the link between the two UEs. The signal may include a destination ID of the receive UE to the transmit UE. The receive UE may obtain the identity (ID) of the transmit UE (sometimes called the source ID) through a confirmation signal from the BS or a discovery signal the receive UE receives from the transmit UE.

After the link is established, such that the UEs are aware of which UE(s) are transmitting and which UE(s) are receiving, the network can semi statically configure the same set of transmission parameters to both the transmit UE or transmit UE group, and the receiving UE or transmit UE group. The parameters can be configured in RRC signaling, in broadcast signaling (e.g. in system information) or pre-configured to the UEs.

Each set of parameters may include, but is not limited to:
Time and frequency resources, periodicity, pattern window length, frequency sub-channel definition, location of SCI, (initial or default) transmission pattern and/or transmission pattern pool, MCS or MCS pool, DMRS or DMRS pool, frequency hopping parameters, repetition K, HARQ process related parameters, feedback channel locations, RV sequence, and optionally Destination ID or destination group ID and optionally source ID and optionally destination ID.

Since the set of parameters are configured for both transmit UE and receive UE, the transmit UE can use the set of parameter for transmission and the receive UE can use the same set of parameters to receive the SL data transmission sent by the transmitter UE.

The BS may signal the set of parameters individually using UE specific signaling, such as RRC signaling, to the transmit UE and receive UE. In such scenario, a destination ID may be included with the parameter set sent to the transmit UE. A source ID may be included with the parameter set sent to the receive UE. The set of transmission parameters should be the same for the transmit UE and receive UE for the receive UE to receive the SL transmission. In some embodiments, the BS may broadcast or multicast the same configuration of parameter to both the transmit UE and the receive UE. In such a scenario, since the same signaling that includes the set of parameters is sent to both the transmit UE and the receive UE, the set of parameters may include or be associated with both the source ID and destination ID such that both the transmit UE and receive UE can identify which link the parameter is used for.

In some embodiments, to indicate a data transmission, an SCI is transmitted in the configured location. Once a receive UE detects the SCI at the configured location, the receive UE assumes the set of RRC configured or preconfigured transmission parameters will be used. The destination ID can be included in the header information, such as in a media access control (MAC) header or a MAC control element (CE) or in general just part of the data transmission, so if data transmission is successful, the UE can confirm whether the transmission is targeted for the UE.

In some embodiments, to indicate a data transmission, a DMRS is transmitted in the configured location. In this case, an SCI may not be transmitted at all. Once a receive UE detects the DMRS at the configured location, the receive UE assumes the set of RRC configured or preconfigured transmission parameters will be used. Once again, the destination ID can be included in the header information, such as a MAC header or in a MAC CE or in general just part of the data transmission, so if data transmission is successful, the UE can confirm whether the transmission is targeted for the UE.

Alternatively, the UE may be configured to detect the data based on the time-frequency resource or transmission pattern and/or MCS defined in the configuration and if detection is successful, the UE can confirm whether the transmission is targeted for the UE by obtaining the destination ID in the data transmission. In this case, the UE is not relying on the SCI or DMRS.

In another example, the SCI is transmitted, but the SCI may include a destination ID without scheduling information. In such embodiments, a receive UE may be configured to decode the SCI first, and if the destination ID is confirmed to be for the receive UE, then the receive UE attempts to decode the data using parameters defined in the configuration.

Example 2: Multiple Receive Parameter Sets Associated with DMRS or Preamble or Source ID With this example, a UE is configured with multiple receive parameter sets, (for example by RRC signaling, system information in one or more SIB or preconfigured). This may be viewed as configuring a receive resource pool and multiple sets of receive parameters configured inside a receive resource pool. Alternatively, each set of receive resource parameters is configured in a resource pool. In another example, each set of resource parameters may simply be a set of receive resource configuration within a GF configuration.

In some embodiments, the UE is configured with multiple GF configurations, which may be defined within SL BWPs. Each GF configuration may include one or more of transmit resource or resource pool and receive resource or resource pool.

The multiple configurations can be semi-static or semi-persistently configured, the configuration signaling can include RRC, system information (SIB), preconfigured, or a combination of RRC and SIB.

Each set of receive parameters for a receive UE may include one or more of: time/frequency location, periodicity, frequency sub-channel definition, transmission pattern or transmission pattern pool, pattern window length, DMRS/preamble or DMRS pool, transmission patterns, SCI location, MCS or MCS pool, repetition K, RV sequence, HARQ process related parameters, feedback channel parameter, and in some embodiments source ID. The set of parameters within one set may be considered to be associated with each other. Once the UE determines one parameter in the set while receiving a SL transmission, the UE may derive other parameters based on this association.

Each set of parameters for a transmit UE may include one or more of: time and frequency resources, periodicity, pattern window length, frequency sub-channel definition, location of SCI, (initial or default) transmission pattern and/or transmission pattern pool, MCS or MCS pool, DMRS/preamble or DMRS pool, RV sequence, HARQ process related parameters, feedback channel parameter and in some embodiments destination ID or destination group ID In some embodiments, an SL transmission pattern represents a sparse set of communication resources. More generally, the SL transmission pattern defines how communication resources are to be used by UEs for SL transmissions, and can be designed to enable all UEs in a cooperation group to communicate with each other even if some transmissions are transmitted in a grant-free manner (i.e., without dynamic scheduling). This could be especially useful in applications such as V2X and UE cooperation, and/or other applications as well.

In some embodiments, the transmission pattern indicates a number of "on" or usable resources within the time window of the transmission pattern. In a time-frequency based transmission pattern, for example, the UE transmits using time-frequency communication resources in time slots that are designated as "on" time slots by the transmission pattern, and receives in time slots that are not designated as "on" time slots (or are otherwise designated as "off" time slots) by the transmission pattern. In this sense, a transmission pattern could be considered a form of "on-off" pattern in some embodiments.

The transmission pattern (or, in some embodiments, the on-off pattern) may define the resources used for a number of transmissions of a transport block (TB). The transmissions may include the initial transmission and retransmissions of the same TB. The initial transmission and retransmission of the TB may sometimes also be referred to as repetitions. In some embodiments, each transmission pattern may represent transmissions of one transport block, i.e., a UE should start initial transmission of a TB at the first "on" slot in the transmission pattern, and continue repetition of the TB on all the "on" slots until the end of the "on" slots defined by the transmission pattern. In this type of application, a transmission pattern (or on-off pattern) could be considered a repetition pattern. In some embodiments, a UE may also listen to other UE's transmissions in the "off" slots defined by the transmission pattern or any slot that is not defined as an "on" slot in the transmission pattern. As described above, reference signals may be used to accommodate SL data transmission. Some embodiments described herein outline signaling mechanisms that could be used to for grant-free SL communications using transmission patterns.

In some embodiments, a UE is configured to use a transmission pattern defining or otherwise indicating communication resources that are allotted or allocated to the UE over a specific time interval for SL communications. Other UEs are similarly configured to use respective transmission patterns over this time interval. A UE can transmit and receive SL transmissions within a time interval using these communication resources according to its transmission pattern. A half-duplex UE might still be transmitting at certain times while other UEs are transmitting, but transmission patterns could be designed to provide an opportunity for each UE to receive SL transmissions from all other UEs at least once during the time interval if all UEs are configured and transmitting during the time interval using their respective transmission patterns.

Time is one dimension that may be used in defining communication resource usage in a transmission pattern. Other dimensions, such as frequency, code, and/or signature are also contemplated.

Transmission patterns may belong to a transmission pattern set or pool that is common to a group of UEs. RRC signaling may be used to configure the transmission pattern for a UE and/or a transmission pattern pool. Transmission pattern pool may also be signaled by broadcast signaling (e.g. in SIB).

FIG. 1A is a block diagram illustrating an example of a two-dimensional resource configuration for grant-free SL transmission. This is an example of a transmission pattern. FIG. 1A illustrates a resource grid 100, which includes frequency-domain resources F0, F1, F2 and F3, and time-domain resources T0, T1, T2, T3 and T4. Each combination of frequency-domain resource and time-domain resource forms a communication resource for SL transmission. FIG. 1A also illustrates a transmission pattern for a UE1. Resource grid 100 indicates a time-frequency communication resource for two transmissions by UE1, as well as a redundancy version (RV) (RV0 or RV3) in a label on each communication resource.

In FIG. 1A, UE1 is configured with a transmission pattern, which explicitly defines the transmission repetition number as well as the communication resources for each repetition. Each repetition may also be associated with an RV, which can be predefined or preconfigured (e.g. configured using a UE specific RV sequence indicating the associated RV for each repetition). A single UE index is used to indicate both time-domain and frequency-domain resources in FIG. 1A. In general, a UE index corresponds to a specific UE or a UE group. The communication resources assigned to UE1 form the transmission pattern for UE1.

The resource grid 100 has a frequency-domain length of 4 and a time-domain length of 5. In the time-domain, T0 to T4 could be slots, mini-slots, symbols, or any other quantization or unit of time. In the frequency-domain, F0 to F3 could be frequency sub-channels, combinations of sub-channels, resource blocks, resource block groups (RBGs), bandwidth parts (BWPs), subcarriers, a number of subcarriers, carriers or any other quantization or unit of frequency. Different frequency domain sub-channels are just an example. Sub-channels can instead be associated with different layers of non-orthogonal multiple access (NOMA), different pilot resources, and/or other resources. Although shown as time-domain resources and frequency-domain resources in FIG. 1A, in general the transmission pattern could also or instead include code-domain resources (such as sparse code multiple access (SCMA)), space-domain resources, and/or different demodulation reference signals (DMRS). Moreover, the transmission patterns are not limited to two-dimensions, and therefore could include a number of dimensions greater or less than two.

In some embodiments, frequency-domain resources, pilots and layer index may be associated with time-domain signatures. For example, as an alternative to using a UE index, the resource grid 100 could indicate only the time-domain signature or time-domain transmission pattern, and other dimensions (e.g. the frequency-domain dimension) may be derived from it.

Figure 1B:
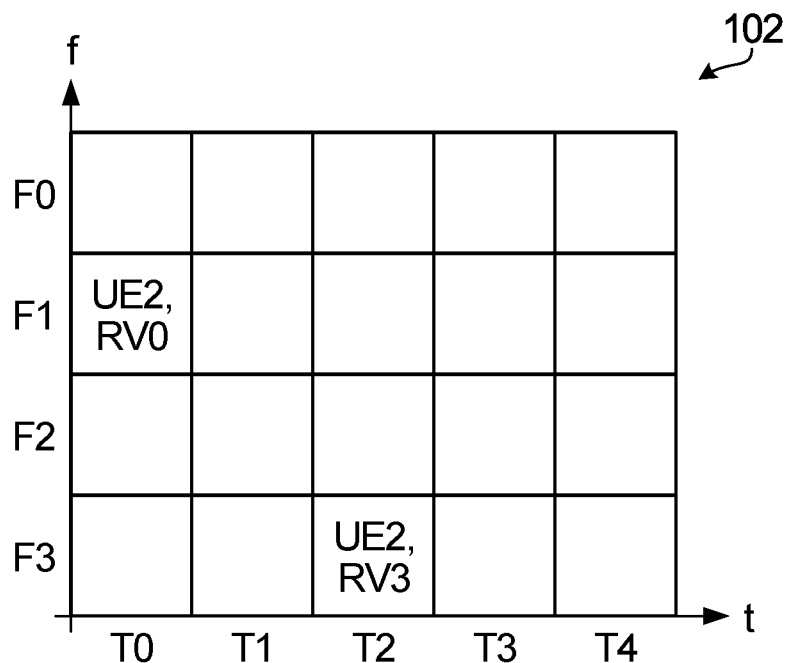
FIGS. 1B-1K are block diagrams illustrating other examples of two-dimensional resource configurations for grant-free SL transmission.
Figure 1C:
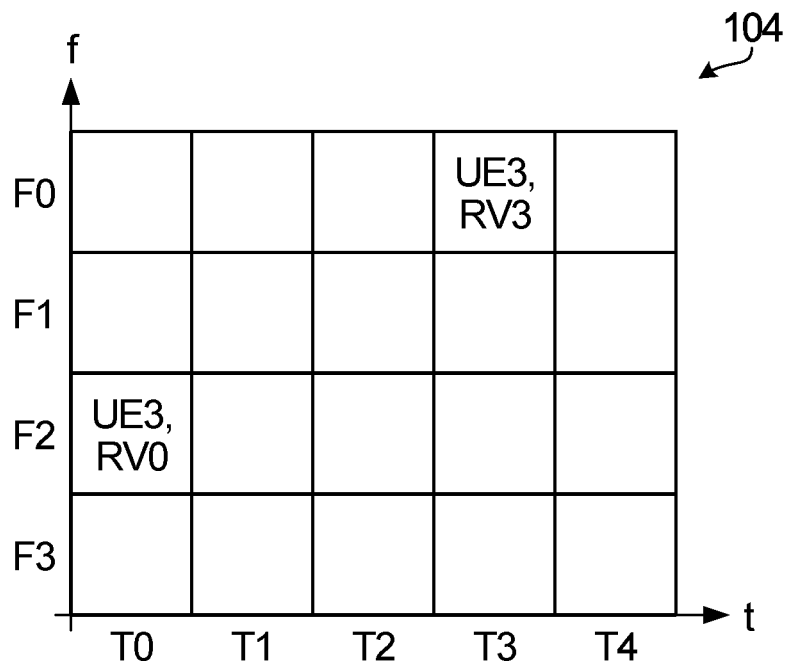
Figure 1D:
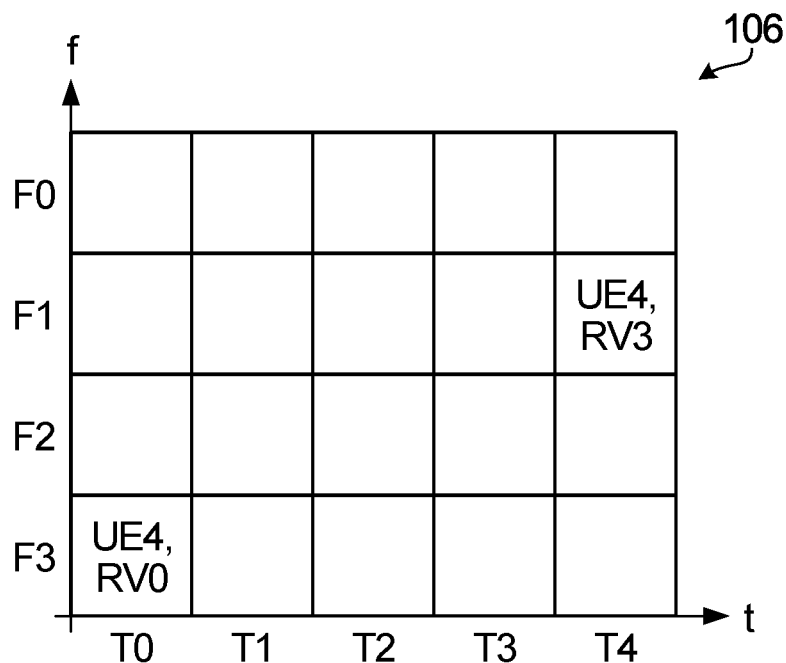
Figure 1E:
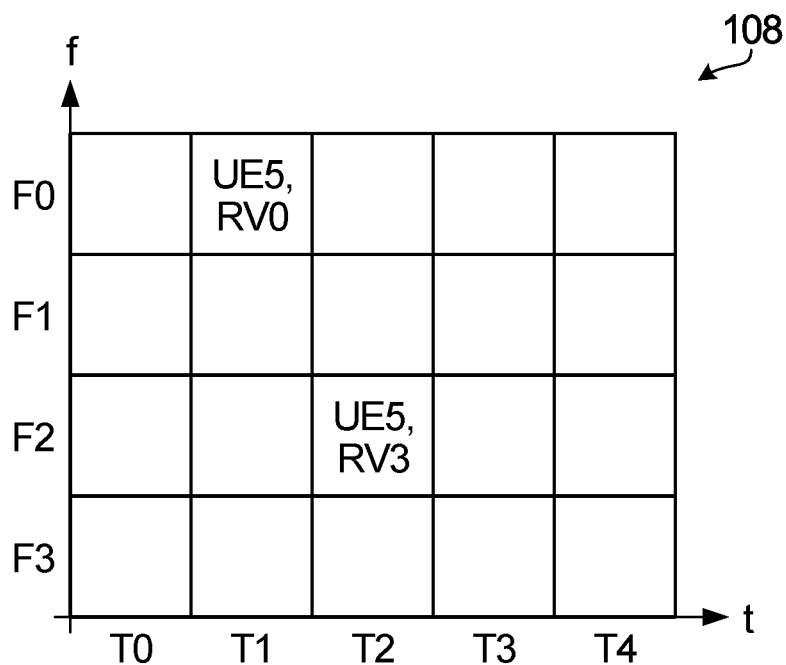
Figure 1F:
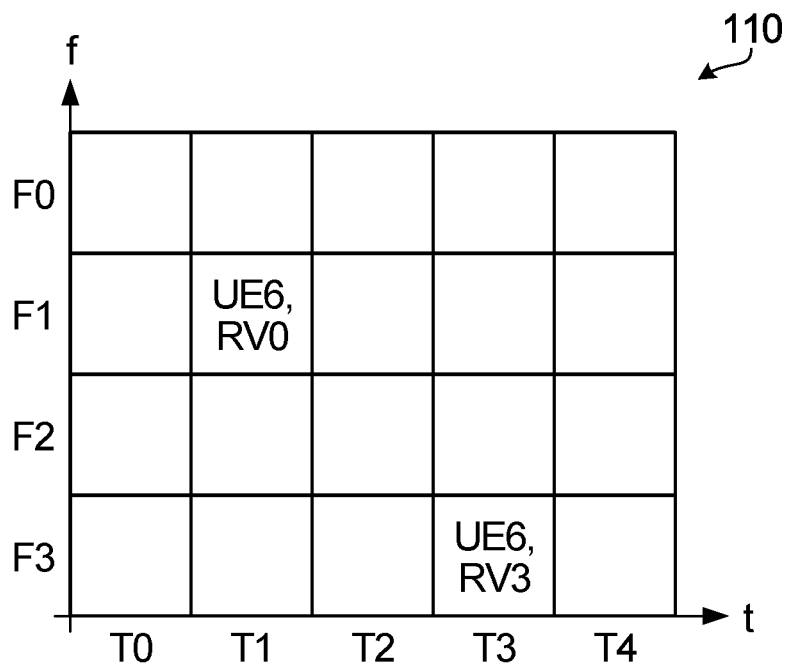
Figure 1G:
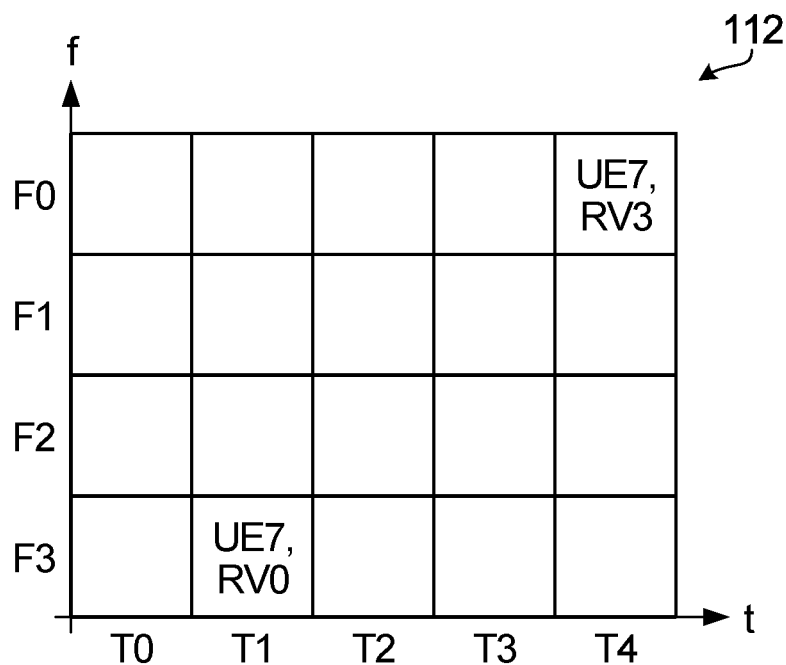
Figure 1H:
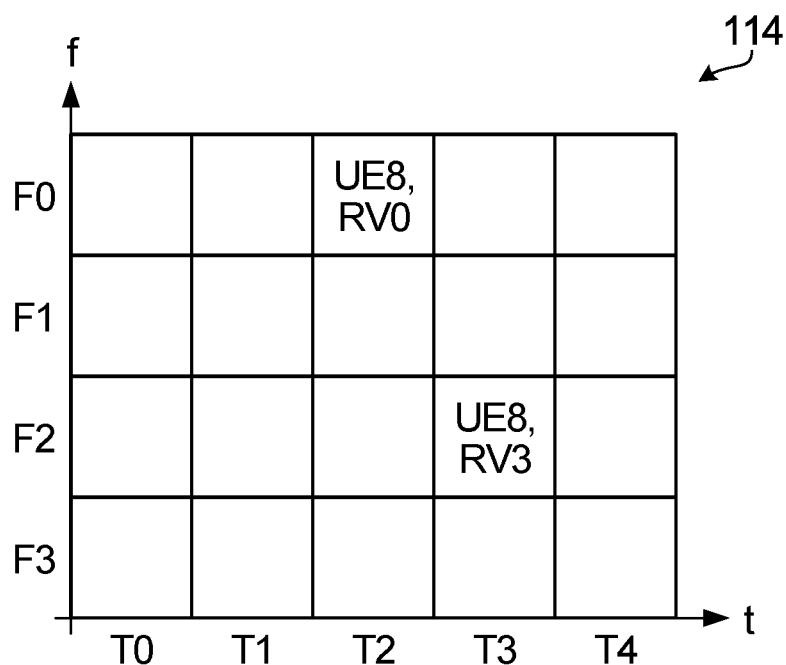
Figure 1I:
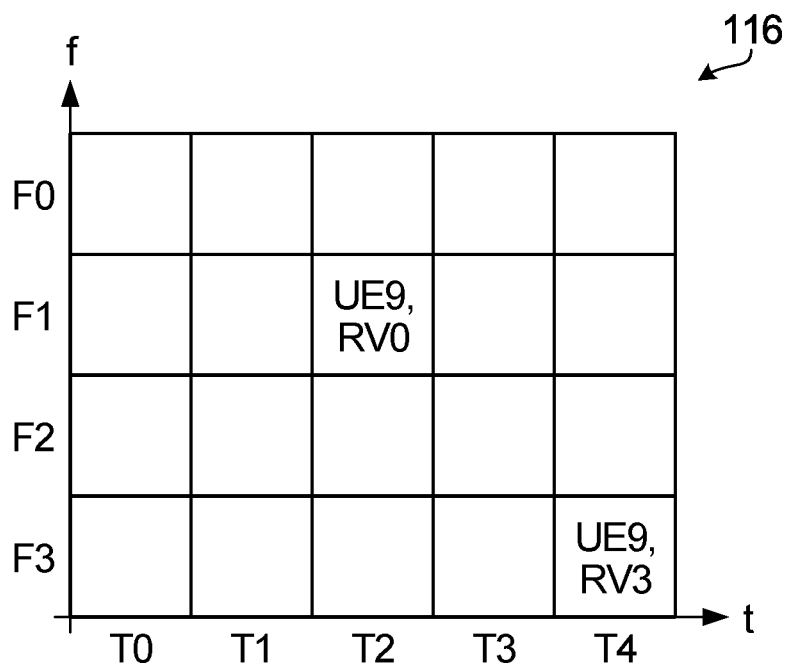
Figure 1J:
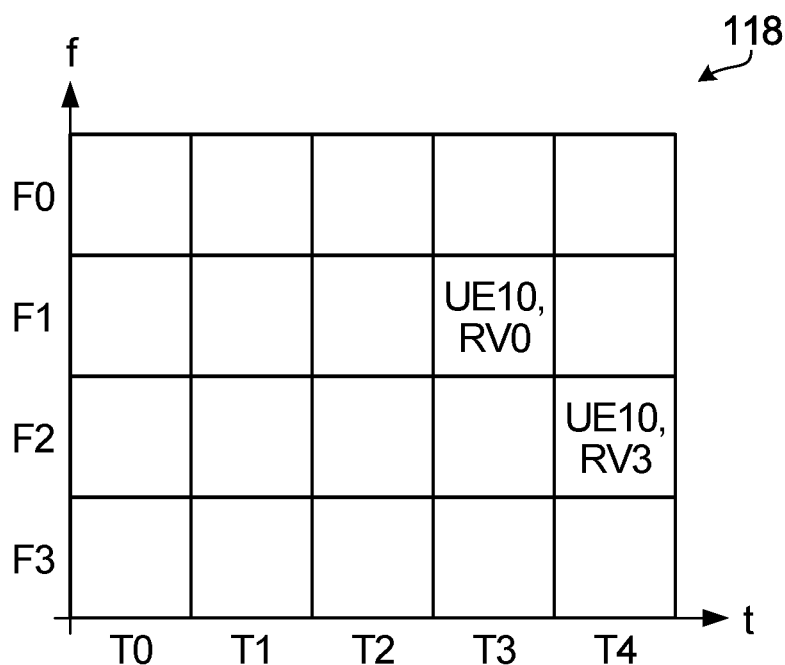

FIG. 1B is another block diagram illustrating an example of a two-dimensional resource configuration for grant-free SL transmission. FIG. 1B illustrates a resource grid 102. Resource grid 102 includes the same frequency-domain resources F0, F1, F2 and F3, and time-domain resources T0, T1, T2, T3 and T4 as resource grid 100 in FIG. 1A. FIG. 1B also illustrates a transmission pattern for UE2.

Resource grid 102 indicates time-frequency communication resources for two transmissions by UE2, as well as a redundancy version (RV0 or RV3) in a label on each communication resource. These time-frequency communication resources define the transmission pattern for UE2. The time-frequency communication resources indicated in resource grid 102 for UE2 are different from the time-frequency communication resources indicated in resource grid 100 for UE1.

FIGS. 1C, 1D, 1E, 1F, 1G, 1H, 1I and 1J are further block diagrams illustrating other examples of two-dimensional resource configurations for grant-free SL transmission. FIGS. 1C, 1D, 1E, 1F, 1G, 1H, 1I and 1J illustrate resource grids 104, 106, 108, 110, 112, 114, 116 and 118, respectively, each resource grid including the same frequency-domain resources F0, F1, F2 and F3, and time-domain resources T0, T1, T2, T3 and T4 as resource grid 100 in FIG. 1A. Resource grids 104, 106, 108, 110, 112, 114, 116 and 118 each indicate communication resources defining the transmission patterns for UE3, UE4, UE5, UE6, UE7, UE8, UE9 and UE10, respectively, as well as a redundancy version (RV0 or RV3) in a label on each communication resource. Each communication resource indicated by resource grids 100, 102, 104, 106, 108, 110, 112, 114, 116 and 118 are unique.

Figure 1K:
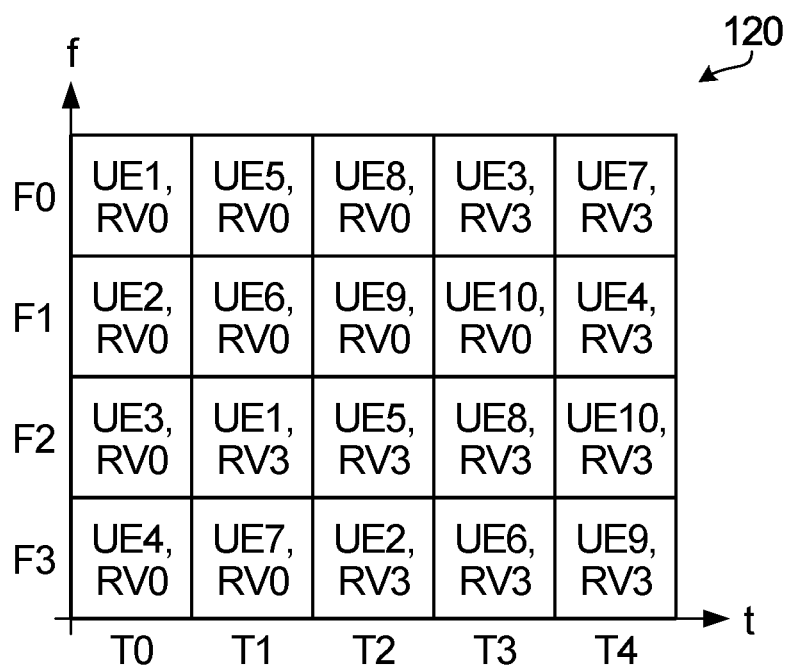

FIG. 1K is yet another block diagram illustrating a two-dimensional resource configuration for grant-free SL transmission. FIG. 1K illustrates resource grid 120, which also includes the same frequency-domain resources F0, F1, F2 and F3, and time-domain resources T0, T1, T2, T3 and T4 as resource grid 100 in FIG. 1A. Resource grid 120 is a superposition of resource grids 100, 102, 104, 106, 108, 110, 112, 114, 116 and 118. Therefore, resource grid 120 may be considered to indicate a transmission pattern pool, which includes the transmission patterns for UE1-UE10.

The communication resources illustrated in FIG. 1K are used for SL transmission by respective UEs, according to their transmission patterns. In general, each communication resource represents a potential transmission of a transport block (TB). The same TB is used in each transmission by a UE over the length of a transmission pattern. In FIG. 1K, according to their respective transmission patterns, each UE transmits a TB twice over the length of the configured transmission pattern, therefore the repetition number of each transmission pattern is 2. As explained below, this allows each UE to receive at least one transmission of the TB by the other UEs.

Each parameter set has a DMRS/preamble configuration that is associated with that parameter set. Once a UE decodes the DMRS/preamble, by using the DMRS/preamble alone or using the DMRS/preamble along with the time frequency location of DMRS or SCI or data transmission that it detects, the UE can determine the associated parameter set, such as the transmission pattern, MCS, RV sequence. No blind detection is needed.

In another example, a UE may determine the receive parameter set based on source ID. The source ID may have an association with the transmission parameters, such as transmission pattern, MCS, DMRS, etc. The association can be defined by having a source ID and other parameters, such as MCS and DMRS, in the same set of receive parameters. For example, if there is an SCI transmitted that is associated with the PSSCH transmission, the SCI may include the source ID and destination ID. Once the receive UE verifies the source ID belongs to one of the receive resource parameter sets, the UE may attempt to decode the data based on the corresponding receive resource parameter set.

In another example, if a UE detects the time frequency location of a PSSCH transmission (e.g. locate the transmission of SL data in a specific slot and specific frequency subchannel or subchannels), then the UE can find which receive resource set is used simply based on the time frequency location of the transmission. The detection of PSSCH transmission can be done through SCI detection, if the SCI exists, or DMRS detection or simply energy detection of the transmission signal. Again, if the SCI includes the destination ID, a UE can verify whether the transmission is targeted for itself by checking the destination ID.

For transmission, each UE may be configured with one or multiple sets of transmit parameters. Each set of transmit parameters may include time/frequency location, periodicity, frequency sub-channel definition, DMRS/preamble, transmission pattern, SCI location, MCS, repetition K, HARQ process related parameters, feedback channel, and in some embodiments destination ID. If the set of parameters includes the destination ID, the UE may use the set of parameters for transmission to the specific UE or UE group defined by the destination ID. If a UE is configured with a set of parameters without the destination ID, the UE may use the set of parameters for transmission to any UE or UE group.

This example requires the network to have some coordination for configuration in order to match transmit and receive parameter sets. In UL GF, the BS is the receiver and knows all the configuration parameters. In SL GF, the receiver UE does not know the configuration, so the network configures all possible parameter sets to the UE.

Example 3—Receive Parameter Pool for Each Receive Parameter

With this example, a receive UE is configured with respective receive parameter pools for a number of different receive parameters. Further, a transmit UE may be configured with a set of transmit parameters or with respective transmit parameter pools for a number of different transmit parameters. When the transmitter UE performs the sidelink transmission using given transmit parameters, the receive UE will need to receive the sidelink transmission using correct receive parameters that correspond to the given transmission parameters. Embodiments of present disclosure enable the receive UE to use the correct receive parameters to receive a sidelink transmission. In some embodiments, the receive parameter pools will include sets of receive parameters corresponding to the transmission parameters, and each set of receive parameters includes a first parameter associated with one or more other parameters. In this way, if the receive UE can obtain the first parameter, the receive UE may derive one or more of the remaining parameters necessary for receiving the sidelink transmission.

The receive parameter pools may include: time/frequency resource pool, transmission pattern pool, MCS pool, DMRS pool etc., frequency sub-channel definition, RV sequence pool. Some of the receive parameters may be the same as the transmit parameters and not be signaled separately.

The transmit UE may be explicitly configured, by a base station, with a set transmit parameters, such as transmission pattern, DMRS, MCS, etc. In this case, the transmit UE performs the sidelink transmission using the set of configured transmit parameters. For example, the transmit UE may be configured with one or multiple sets of transmit parameters. Each set of transmit parameters may include time/frequency location, periodicity, frequency sub-channel definition, DMRS/preamble, Transmission pattern, SCI location, MCS, repetition K, HARQ process related parameters, feedback channel, RV sequence and in some embodiments destination ID. If the set of parameters includes the destination ID, the UE may use the set of parameters for transmission to the specific UE or UE group defined by the destination ID. If a UE is configured with a set of parameters without the destination ID, the UE may use the set of parameters for transmission to any UE or UE group.

Alternatively, the transmit UE may be configured, by the base station, with a pool of transmission parameters, rather than an explicit set of transmission parameters. For example, the transmit UE may be configured with one or more of a transmission pattern pool, DMRS pool, and MCS pool. In this case, the UE may select one or more transmission parameters from the pool of transmission parameters. In particular, the selected one or more transmission parameters associated with another transmission parameter and if this association is known to the receive UE. Therefore, the receive UE can use this association to more easily obtain the receive parameters necessary for receiving the sidelink transmission.

Since the transmission parameters include these associations that can be known to the receive UE, the transmit UE can select one or more transmission parameters in a variety of ways. For example, the transmit UE can randomly select a transmission pattern from a pool of transmission patterns. The transmit UE will then use that transmission pattern and other associated transmission parameters, such as DMRS and/or MCS, to perform a sidelink transmission. In a further example, multiple DMRS are associated with the selected transmission pattern; therefore, the transmit UE may select a DMRS from the subset of DMRS. In any of these above examples, the receive UE may implicitly derive the transmission pattern of the transmit UE if it can obtain the DMRS associated with the transmission pattern. In another example, if a DMRS is associated with both MCS and transmission pattern, the UE may first select a transmission pattern among the transmission pattern pool, a MCS among a MCS pool, then the UE may further select a DMRS among the subset of DMRS that are associated with the selected transmission pattern and MCS.

If the SCI is used and associated with the SL data transmission, the SCI may include a destination ID or destination group ID for quick decoding. In this case, the UE detects the SCI and determines whether to decode the resource based on whether the destination ID matches itself.

Alternatively, no SCI is transmitted, and the UE attempts to decode the data first and verify a destination ID that is transmitted along with the data. In this case, the UE decodes all the potential transmissions and finds the destination ID after decoding the data.

The DMRS/preamble or an advanced indication signal may be used to indicate one or a combination of:
transmission pattern within the transmission pattern pool;
time and frequency locations of each transmission/repetition of a TB or simply each transmission within a transmission window or periodicity;
MCS within MCS pool;
Redundancy version; and
HARQ process ID.

Once a UE detects the DMRS/preamble/other indication, the UE can determine the indicated parameters (transmission pattern and/or MCS and/or RV) in order to decode the data. For example, some other parameters, such as source ID, MCS, HARQ process ID, destination ID or more detailed destination ID if it is partially included in the SCI, can be included in the header or just included in the data transmission. After decoding DMRS/preamble/other indication, the UE obtains all the information required for decoding. If the MCS is not indicated by the DMRS, the UE may do blind detection of the MCS based on the MCS pool or potential MCS.

UE Determining if Transmit UE using SCI

Figure 4:
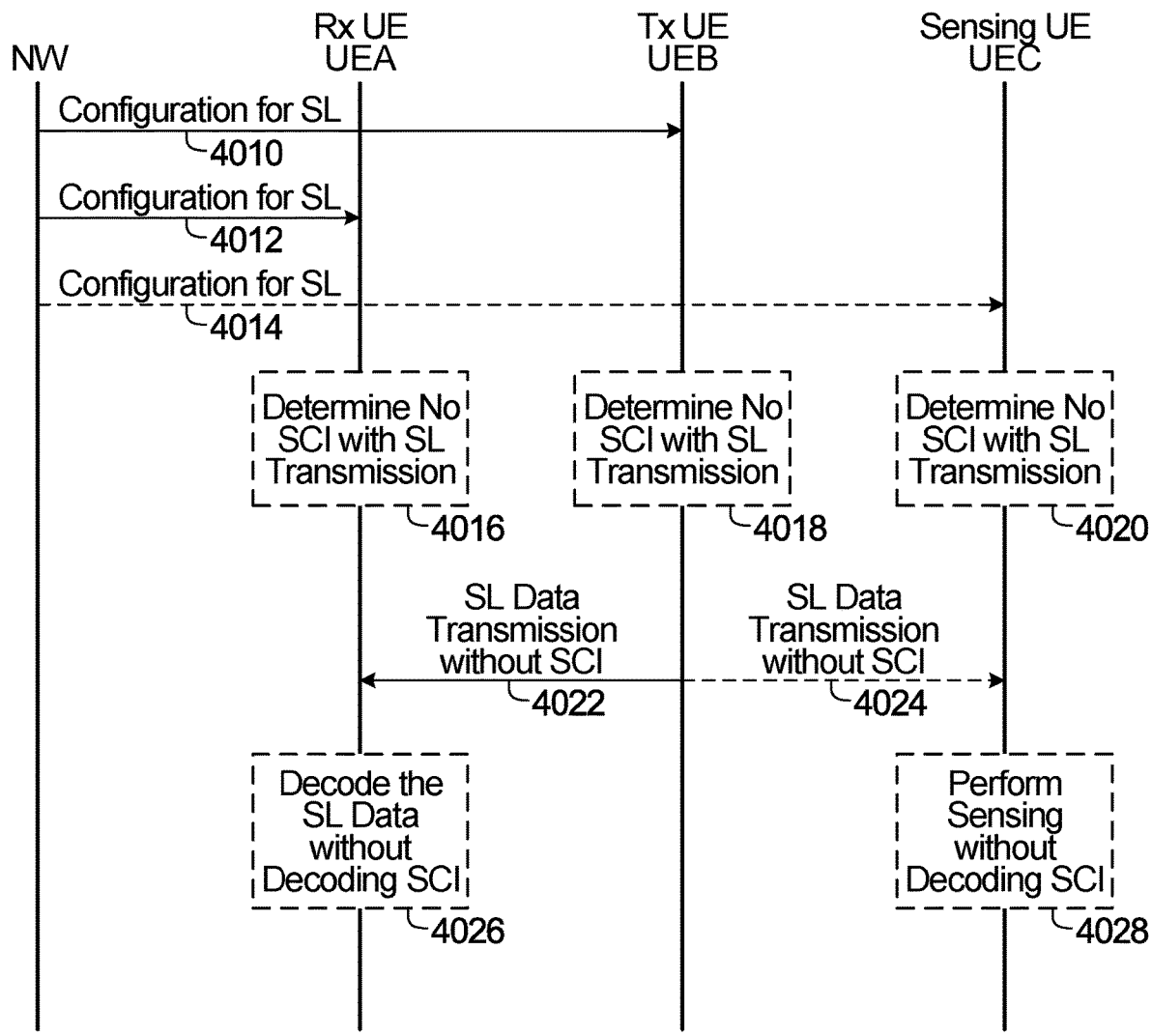
FIG. 4 is an example signal flow diagram describing a SL transmission scheme according to an embodiment of the disclosure.

FIG. 4 illustrates an example of a signal flow procedure of SL transmission without SCI. An example of this SL transmission sub-mode without SCI may be a SL GF transmission or configured grant transmission sub-mode as described in this disclosure. The example, includes communication between the network (NW) and three UEs, noted as UEA, UEB, UEC, which function as a receive (Rx) UE, a transmit (Tx) UE and a UE performing sensing for SL transmission, respectively.

At step 4010, UEA, receives configuration information including the SL transmission resource and parameters for the SL transmission. At step 4012, UEB, receives configuration information including the SL transmission resource and parameters for the SL transmission. At step 4014, UEC, receives configuration information including the SL transmission resource and parameters for the SL transmission. The configuration information can be configured by the network or preconfigured. Various methods of preconfiguration have been discussed earlier in this disclosure. If the configuration is configured by the network, the configuration can be provided in RRC signaling or system information (e.g. system information block (SIB)). The signaling can be UE specific, common for a group of UEs, or common for all the UEs of a cell. If the SL transmission is a mode 1 transmission, the configuration is performed when the UE is in coverage. The configuration can be configured by the network, or more specifically by a base station (BS) serving the UE via RRC signaling or SIB.

The configuration for the SL transmission parameters may include time/frequency resource information, a transmission pattern, MCS, DMRS, RV sequence, etc. The configuration for the transmit UE (UEB) may include at least configuration for transmission parameters. The configuration can be performed via configuring a resource pool, which may include time frequency locations that. The configuration of transmission parameters and resources may include configuration of UE specific parameters, such as one or more of multiple transmission patterns, MCS, DMRS configuration, RV sequence, etc. The transmit UE should then use the configured transmission parameters and resource for SL transmission. The UE specific transmission parameters are usually used for NR SL transmission Mode 1. In NR sidelink Mode 1 configured grant Type 1 transmission, such configuration is performed using RRC signaling. The configuration of transmission parameters and resources may include a pool of resources or transmission parameters, such as a transmission pattern pool, MCS pool, DMRS pool, where the UE can select one or more resource and one or more parameter from among the resource/parameter pool for the SL transmission. This is usually used in NR SL transmission Mode 2.

The configuration for transmitting and/or receiving a SL transmission may include configuring a resource pool. A resource pool includes at least a pool of time/frequency resources for SL transmission. A resource pool configuration may include time domain resources that can be used for SL, such as the slots that available for SL transmission. Resource pool configuration may also include frequency domain resources that can be used for SL. For example, an available transmission bandwidth may be configured in the resource pool. In addition, the transmission bandwidth may be divided into multiple subchannels, each subchannel may contain a number of contiguous resource blocks (RBs) in the frequency domain. The resource pool configuration may also include the definition of subchannels. The subchannel may be the minimum granularity in the frequency domain such that each SL transmission may take one or more subchannel in the frequency domain.

For the SL transmission mode described for FIG. 4, in addition to the time frequency resource configuration defined above, additional information may be configured. For example, in the resource pool configuration, transmission pattern or transmission pattern pool may be additionally configured. The transmission pattern may also sometimes be called a resource pattern. In another example, an MCS pool which includes a pool of potential MCS than may be used is also configured. In another example, a DMRS pool which defines a pool of potential DMRS or DMRS parameters that may be used are configured. In another example, an association between the DMRS in the DMRS pool with other parameters, such as the transmission pattern and MCS, are also configured.

For the transmission pattern or transmission pattern pool configured within a resource pool, a pattern is defined in terms of a size of the resource in time and frequency, position(s) of a resource in time and frequency, and a number of resources. The transmission pattern or pattern pool configuration may include a periodicity of the pattern/resource, a transmission pattern window length in time, a size of each SL transmission in the time domain (e.g. one or multiple slots), a size of each SL transmission in frequency domain (e.g. one or multiple subchannels), a definition of the pool and time frequency locations of the specific pattern. Additional description pertaining to transmission patterns and pattern pool configuration has been described in this disclosure. FIG. 3 shows a specific example of time/frequency parameters, definition of subchannnels, transmit pattern, etc. For this example, time is on the horizontal axis and frequency is on the vertical axis. Frequency is divided into four segments; each division is the frequency partition for one PSSCH transmission in the frequency domain, which may be one or multiple resource blocks. Each frequency partition may be one subchannel or multiple subchannels. The number of RBs and starting RBs for each frequency subchannel may be determined from the resource configuration or definition of resource pool. The number of subchannels used for each PSSCH transmission in the frequency domain in the case when multiple subchannels can be used may also be signaled in the resource configuration. Time is shown in FIG. 3 divided into ten time units; each division is the size of a PSSCH transmission in the time domain, and may be one or multiple orthogonal frequency division multiplexed (OFDM) symbols. Each division can be a slot. A transmit pattern is made up of multiple blocks of time frequency resources. For example, the pattern labelled VUE1 has a block in F0, T0, and another block in F2, T1. Shown are 19 patterns within the depicted resource. Note that in the pattern shown below, T0 to T4 shows a pattern window, within which the non-overlap pattern of VUE 1 to VUE 10 is defined. 10 new patterns for another different 10 UEs (VUE11-VUE20) are defined in T5-T9, which is a repetition of the 10 patterns defined in T0-T4. The 20 patterns defined within the pattern grid shown in the figure may be repeated over time for VUE1 to VUE 20, i.e., VUE1 to VUE20 may be configured a new pattern of two resources every 10 time units. Use 1 time unit (T0) equals 1 slot as an example, in the example pattern pool defined in the following figure, the pattern window length=5 slot and periodicity=10 slots. When transmission pattern is configured within a resource pool, the minimum transmission granularity may be the resource or transmission pattern.

For the receive UE (UEA), the configuration may also include similar SL transmission parameters or a resource pool that includes a pool of time/frequency resource and a pool of parameters, such as a transmission pattern pool, a MCS pool, a DMRS pool, etc., for the purpose of receiving the SL transmission. The receive UE may receive SL data transmission at a time frequency resource within the configured resource pool.

Similarly, the UE performing sensing for SL transmission (UEC) is also configured with similar resource and/or parameter pool for sensing purpose. All the configuration steps (4010, 4012, 4014) may also include an association between different parameters, such as an association between the DMRS and a transmission pattern and/or MCS, as described in other examples of this disclosure. Note that sensing may be performed for NR SL transmission Mode 2 and may not be needed/used for NR SL transmission Mode 1.

A resource configuration for receiving and/or sensing may be a receive resource/parameter pool that is separately configured from a transmission resource pool, or the transmission resource pool and the receive resource pool may be configured as one resource pool. For example, in one scenario, a UE may be configured with a transmit resource pool for transmitting SL transmission, and a separate receive resource pool for receiving or sensing SL transmission purpose. In another scenario, a UE may be configured with one resource pool, and the resource pool configuration can be used for both transmit and receive SL transmissions. The resource pool may also be used for sensing, which can be consider one type of receiving SL transmission.

After the configuration 4012, UEB optionally determines 4018 that no SCI association with SL data transmission is used. The determination of whether SCI associated with the SL data transmission used may be with respect to the potential SL data transmissions within the configured resource pool. The determination may be based on one or more different conditions, such as a transmission pattern, multiple transmission patterns, or a transmission pattern pool, or transmission pattern or transmission pattern pool within a resource pool that is included in the configuration. Another condition involves determining that a MCS pool or DMRS pool are included in the configuration or resource pool. A further condition involves determining that an association of parameters, for example, an association of DMRS with transmission pattern or MCS, etc., is included in the configuration. In another example condition, it may be determined that there is a greater than threshold level of Quality of Service (QoS) value determined from configuration information. UEB then transmits 4022 a SL data transmission targeting receiver UEA without a SCI. More conditions may be described in specific examples that described later and some are described below:

if the UE is configured with SL configured grant or GF transmission in Mode 2, the UE may assume there is no PSCCH associated with the corresponding PSSCH data transmission; or if the UE is configured with a transmission pattern, a transmission pattern within a resource pool, a transmission pattern pool or a transmission pattern pool within a resource pool, the UE assumes no SCI associated with the data transmission; or if the UE is configured with a MCS pool or DMRS pool, etc., the UE assumes no SCI associated with the data transmission; or if the UE is configured with an association of parameters, etc., the UE assumes no SCI associated with the data transmission; or if the UE is configured with SCI resource configuration within the resource pool, UE assumes there is SCI associated with the data transmission and if the UE is configured without SCI resource configuration within the resource pool, UE assumes no SCI associated with the data transmission; or if the granularity of PSSCH or SL data transmission is based on resource pattern (instead of subchannel in the frequency domain and slot in the time domain), the UE assumes no SCI associated with the data transmission.

Furthermore, in some embodiments, if the UE is configured with a certain quality of service (QoS) level, then the UE assumes no SCI associated with the data transmission. This is because the GF or configured grant transmission is usually used for applications that require a high reliability. In some cases, the QoS is implicitly indicated by a logic channel of the data. For example, if the UE is configured with a certain logic channel with a corresponding property indicating the data in the logical channel is high priority, or has a low latency application, the UE may assume no SCI associated with the data transmission.

The reason that the UE determines that there is no SCI associated with the SL data transmission is because the SCI is not needed to indicate the transmission resource and parameters and the UE can still decode the SL transmission or perform sensing without the SCI, as described earlier. For example, the UE can first detect the DMRS among the configured DMRS pool at a time frequency location within the resource pool. After detecting the DMRS, the UE can use the association of DMRS with other parameters, such as transmission pattern and MCS to obtain these receive parameters (e.g. transmission pattern and MCS). The UE then use these receive parameters to decode the data without first decoding a SCI.

UEA also optionally determines 4016 that no SCI associated with SL data transmission for the configured resource pool is used. Therefore, UEA optionally decodes 4026 the SL data transmission from UEB without first decoding the SCI. To decode the SL data transmission without SCI, in one example, UEA detects the DMRS at time/frequency location configured within the resource pool first and then determines which DMRS among a DMRS pool is used. UEA uses the association of DMRS with other parameters, such as at least one of a transmission pattern and MCS to determine the corresponding transmission parameter and uses these parameters to decode the data in the SL data transmission. In another example, the UE may monitor the potential SL transmission at the time frequency location within the configured resource pool and the same transmission parameters may have been configured to UEA and UEB, and UEA determines UEB's SL transmission at the time/frequency location that was configured in the configuration information and identifies UEB's transmission parameters using the configured receive parameters and decode the data.

The SL data transmission from UEB may also be received 4024 by sensing UE UEC without a SCI. Even though UEC is not the target UE for the SL data transmission from UEB, UEC may need to sense the SL transmission from UEB in order to avoid a collision with the transmission resource of UEB's SL transmission if UEC intends to transmit a SL transmission itself. UEC also optionally determines 4020 that there is no SCI associated with the SL data transmission based on similar conditions as UEA and UEB described above. UEC then senses 4028 the SL data transmission without SCI. For example, UEC can detect the DMRS first and find the transmission parameter through association of DMRS with other parameters similar to UEA. In another example, UEC perform sensing 4028 based on channel measurement, such as measuring DMRS energy, measure RSRP, RSSI etc. at predefined time frequency locations or time frequency locations indicated in the configuration.

Note that in the SL transmission, a UE can serve as transmit UE for one SL transmission, receiving UE for another SL transmission and a sensing UE for another different transmission.

The above SL transmission sub-mode does not use SCI that is associated with the SL data transmission. However, in the same system, there are other SL transmission sub-modes that may require SCI to be associated with the SL data transmission. Note that the sub-modes may not be explicitly defined, which are just two different SL transmission schemes within a SL transmission mode. In this sub-mode of SL transmission with SCI (not described in FIG. 4), the transmit UE, receive UE and/or sensing UE may also be similarly configured with a resource pool. The configuration signaling can be done similarly to the method described above in FIG. 4 in steps 4010, 4012 and 4014. In this configuration, each UE may be configured with at least a resource pool, which at least a pool of time frequency resources for SL data transmission (i.e. PSSCH) similar to the sub-mode in FIG. 4. In addition, the physical sidelink control channel (PSCCH) resources that are used for SCI transmission may be also configured in the resource pool. However, in some scenarios, the PSCCH resource may be predefined or directly derived from PSSCH resource and may not need to be explicitly configured. For example, each subchannel at an available slot may be used for PSSCH or SL data transmission, while a fixed number of RBs within the subchannel can be used for the associated PSCCH or SCI transmission.

In this sub-mode, the UE may not be additionally configured with a transmission pattern. In this case, the granularity of the PSSCH transmission may be one or multiple slots in time domain and one or multiple subchannels in frequency domain. In the case of NR SL transmission Mode 2, the transmit UE may perform sensing and select a slot and one or multiple subchannels within the resource pool for the PSSCH transmission. All UEs that are configured with this sub-mode may determine that the SCI should be transmitted along with the associated SL data transmission based on the opposite of the condition defined for the sub-mode in FIG. 4. For example, the UE determines that the SCI associated with the PSSCH should be transmitted based on the condition that there is no transmission pattern configured in the resource pool. Other conditions that are opposite to the conditions to determine that there is no SCI associated with PSSCH transmission can also be applied here. The transmit UE then transmits the SCI along with the PSSCH at the resource within the configured resource pool. The SCI indicates the scheduling information and transmission parameters for the SL transmission. The receiving and sensing UEs will check SCI at all potential SCI locations within the resource pool and decode the SCI first. Once the receiving and sensing UEs find the transmission resource and parameters for PSSCH transmission indicated from the SCI, the receive UE and sensing UE perform decoding of the SL data transmission and sensing using the information obtained from SCI, respectively.

Note that different sub-modes here are only used to describe different types of SL transmission that use or do not use SCI associated with SL data transmission. There may not be an explicit definition of sub-mode in the configuration. And the sub-mode may simply be a property of each resource pool.

The description of FIG. 4 above describes a general methodology for SL transmissions. In some embodiments, the SL transmissions are the SL grant free, or SL transmission with configured grant. Some embodiments described herein may be applicable to GF transmission or GF transmission mode in SL Mode 1 and/or Mode 2. The methodology described may be applicable to other SL transmission modes where applicable. The following paragraphs further describe different examples of the determination of whether the SCI associated with SL data transmission is used, e.g., in SL mode 1 and SL mode 2.

In NR SL transmission mode 1 when the BS controls or schedules the UE transmission, dynamic scheduling or configured grant Type 1 and Type 2 are supported.

For dynamic scheduling, the transmit UE may be configured with a UE specific resource using a DCI from the BS. The UE specific resource may be defined within or without a resource pool configured earlier in RRC signaling or SIB. The transmit UE may use the SCI to transmit data along with the data transmission, where the SCI indicates the transmission resource information for detection and sensing. The receive UE may be configured with a resource pool for receiving in RRC signaling or SIB. The receive UE determines that there is SCI associated with the SL transmission for this resource pool based on any of the conditions described earlier, e.g. based on no transmission pattern defined within the resource pool. The receive UE attempts to decode the SCI at all time frequency resource locations within the configured resource pool. If a SCI is decoded, the UE obtains scheduling information and transmission parameters in the SCI and subsequently decodes the corresponding SL data transmission in PSSCH using the information from SCI.

For configured grant Type 1 or configured grant in general, the UE may not transmit the SCI or physical shared control channel (PSCCH) along with SL data transmission in the physical shared sidelink channel (PSSCH). For transmission, the UE may be configured with a resource pool and the UE is configured with UE specific transmission parameters within the resource pool: such as a time/frequency resource for the transmission, a transmission pattern, a DMRS, a MCS, a RV sequence, etc. For reception or sensing purpose, UE may be configured with a resource pool and a pool of parameters that may be configured within the resource pool, such as transmission pattern pool, DMRS pool, MCS pool, etc. There may be an association of DMRS with other parameters (e.g. transmission pattern, MCS within the pool), where the association can be fixed or configured. For NR SL Mode 1 transmission with configured grant Type 1, the resource pool and additional parameters may be configured in RRC. For configured grant Type 2 in NR SL Mode 1, the resource configuration is done in a combination of RRC and DCI signaling.

The UE may determine whether there is SCI associated with the data transmission based on one or more of the following conditions:

if the UE is configured with configured grant Type 1 or GF transmission, the UE may assume there is no PSCCH associated with the corresponding PSSCH data transmission; or if the UE is configured with a transmission pattern, multiple transmission patterns, a transmission pattern pool or a transmission pattern within a resource pool, the UE assumes no SCI associated with the data transmission; or if the granularity of PSSCH or SL data transmission is based on resource pattern (instead of subchannel in frequency domain and slot in time domain), the UE assumes no SCI associated with the data transmission;

if the UE is configured with a transmission pattern or a transmission pattern pool within a resource pool, the UE assumes no SCI associated with the data transmission; or if the UE is configured with a MCS pool or DMRS pool, etc., the UE assumes no SCI associated with the data transmission; or if the UE is configured with an association of parameters, for example, an association of DMRS with transmission pattern or MCS, etc., the UE assumes no SCI associated with the data transmission; or if the UE is configured with SCI resource configuration within the resource pool, UE assumes there is SCI associated with the data transmission and if the UE is configured without SCI resource configuration within the resource pool, UE assumes no SCI associated with the data transmission.

Furthermore, in some embodiments, if the UE is configured with a certain quality of service (QoS) level then the UE assumes no SCI associated with the data transmission. This is because the GF or configured grant transmission is usually used for applications that require a high reliability. In some cases, the QoS is implicitly indicated by a logic channel of the data. For example, if the UE is configured with a certain logic channel with a corresponding property indicating the data in the logical channel is high priority, or has a low latency application, the UE may assume no SCI associated with the data transmission.

For NR SL Mode 2 transmission, similar conditions may be applied to determine whether there is SCI associated with transmission data. In NR SL Mode 2 transmission, there may be at least two types for SL transmission where in the first type (denoted as Type A), SCI or PSCCH associated with PSSCH transmission is transmitted along with SL data transmission. In another type, denoted as Type B, where no SCI or PSCCH is associated with SL data transmission or PSSCH is used for SL transmission. The type may be implicitly defined for each resource pool configuration. Therefore, a UE may be configured with one or multiple types of transmission if multiple resource pools are configured.

A resource pool for receiving and/or sensing may be a receive resource pool that is separately configured from a transmission resource pool, or the transmission resource pool and the receive resource pool may be configured as one resource pool. For example, in one scenario, a UE may be configured with a transmit resource pool for transmitting SL transmission, and a separate receive resource pool for receiving or sensing SL transmission purpose. In another scenario, a UE may be configured with one resource pool, and the resource pool configuration can be used for both transmit and receive SL transmissions. The resource pool may also be used for sensing, which can be considered one type of receiving SL transmission.

For Type B SL transmission, each UE may be configured with at least a resource pool. For transmitting purpose, a pool of transmit parameters within the resource pool may also be configured, such as a transmission pattern pool, DMRS pool, MCS pool, RV sequence pool, etc. The UE selects the resource or transmission pattern based on sensing results. For receive parameters, the UE is also configured with a resource pool, and additionally in the resource pool, the configuration may include one or multiple transmission patterns, a transmission pattern pool, DMRS pool, MCS pool, RV sequence pool, etc. In some scenarios, if some transmission parameters or parameter pools are the same for transmission and reception, only one parameter or parameter/resource pool is defined and is used for both transmission and reception. The transmission and receive parameter pool or resource pool may also predefine or configure an association of DMRS with other parameters, such as transmission pattern and MCS. In this case, the SCI may not be needed for SL data transmission as the UE can do sensing and detection based on other method, e.g. via DMRS detection within the configured resource pool.

For Type B SL transmission, after the configuration, the transmit, receive and sensing UEs first optionally determine that no SCI is transmitted for SL transmission within the configured resource pool based on one of the condition described earlier, e.g. based on the configuration of transmission pattern or pattern pool within the resource pool. For transmitting a SL transmission, the UE performs sensing at time frequency locations within the configured resource pool and selects a resource or transmission pattern among the resource or transmission pattern configured within the resource pool or transmission pattern pool. The UE then transmits the SL data transmission using the select resource or select transmission pattern to perform the SL data transmission without sending a SCI. For receiving purposes, the receive UE attempts to decode the data at resource or pattern locations within the configured resource pool or transmission pattern pool without decoding the SCI. Examples of how to decode the data or perform sensing without SCI has been described above. For example, the UE can first detect the DMRS among the configured DMRS pool at time frequency location within the resource pool or transmission pattern pool. After detecting the DMRS, the UE can use the association of DMRS with other parameters, such as transmission pattern and MCS to obtain these receive parameters (e.g. transmission pattern and MCS). The UE then uses these receive parameters to decode the data without first decoding a SCI.

In Type A transmission scheme in SL transmission mode 2, UEs are configured with at least a resource pool for transmission, receiving and sensing purpose. The resource pool may have defined time frequency resources, such as definition of subchannels and available slots for SL transmission. One or multiple subchannels defined in the resource pool can be used for SL data transmissions or PSSCH transmission. In addition, the physical sidelink control channel (PSCCH) resources that are used for SCI transmission may be also configured in the resource pool. However, in some scenarios, the PSCCH resource may be predefined or directly derived from PSSCH resource and may not need to be explicitly configured. For example, each subchannel at available slot may be used for PSSCH or SL data transmission, while a fixed number of RBs within the subchannel can be used for the associated PSCCH or SCI transmission. UEs receive such resource pool configuration may optionally determine that SCI associated.

In Type A SL transmission, the UE may not be in additionally configured with a transmission pattern within the resource pool. In this case, the granularity of the PSSCH transmission may be one or multiple slots in time domain and one or multiple subchannels in frequency domain. In the case of NR SL transmission Mode 2, the transmit UE may perform sensing and select a slot and one or multiple subchannels within the resource pool for the PSSCH transmission. All UEs that are configured with resource pool of this type may determine that the SCI should be transmitted along with the associated SL data transmission based on the opposite of the condition defined for no SCI. For example, the UE determines that the SCI associated with the PSSCH should be transmitted based on the condition that there is no transmission pattern configured in the resource pool. In another example, the UE determines that there is SCI associated with the SL data transmission based on the configuration of a resource pool without a DMRS pool or MCS pool. Other conditions that are opposite to the conditions to determine that there is no SCI associated with PSSCH transmission can also be applied here. The transmit UE then transmits the SCI along with the PSSCH at the resource within the configured resource pool. The SCI indicates the scheduling information and transmission parameters for the SL transmission. The receiving and sensing UEs will check SCI at all potential SCI locations within the resource pool and decode the SCI first. Once the receiving and sensing UEs find the transmission resource and parameters for PSSCH transmission indicated from the SCI, the receive UE and the sensing UE can perform decoding of the SL data transmission and sensing using the information obtained from SCI, respectively.

If both with SCI data transmission and no SCI data transmission are supported, the transmit UE may have to determine whether to use the SCI along with the data transmission and as a result, the receive UE may need to determine whether to expect the SCI along with data transmission. The UE may determine whether there is SCI associated with SL data transmission within a configured resource pool. Therefore, the UE may determine whether there is SCI associated with the data transmission based on one or more of the following conditions:

if the UE is configured with SL configured grant or GF transmission in Mode 2, the UE may assume there is no PSCCH associated with the corresponding PSSCH data transmission; or if the UE is configured with a transmission pattern, a transmission pattern within a resource pool, a transmission pattern pool or a transmission pattern pool within a resource pool, the UE assumes no SCI associated with the data transmission; or if the UE is configured with a MCS pool or DMRS pool, etc., the UE assumes no SCI associated with the data transmission; or if the UE is configured with an association of parameters, etc., the UE assumes no SCI associated with the data transmission; or if the UE is configured with SCI resource configuration within the resource pool, UE assumes there is SCI associated with the data transmission and if the UE is configured without SCI resource configuration within the resource pool, UE assumes no SCI associated with the data transmission; or if the granularity of PSSCH or SL data transmission is based on resource pattern (instead of subchannel in frequency domain and slot in time domain), the UE assumes no SCI associated with the data transmission.

Furthermore, in some embodiments, if the UE is configured with a certain quality of service (QoS) level then the UE assumes no SCI associated with the data transmission. This is because the GF or configured grant transmission is usually used for applications that require a high reliability. In some cases, the QoS is implicitly indicated by a logic channel of the data. For example, if the UE is configured with a certain logic channel with a corresponding property indicating the data in the logical channel is high priority, or has a low latency application, the UE may assume no SCI associated with the data transmission.

An advantage of the SCI not including some aspects of scheduling information is that the SCI can be much more compact, or not needed at all. This may save significant overhead. In addition, the reliability of decoding may be higher especially in the case of contention based transmissions.

Reduced Size SCI Including Configuration Index

For both mode 1 and mode 2 configured grant or GF transmission, other than defining a DMRS pool, MCS pool, and transmission pattern pool with DMRS associated with other parameters, the UE can also be configured with multiple sets of receive parameters, with each set of parameters associated with each other. The configuration can be performed using RRC in Mode 1. The configuration can be performed using RRC, system information or system information block (SIB), or preconfigured in Mode 2.

In another embodiment, the UE may be configured with multiple configurations. Each configuration includes one transmitter parameter set and/or one receive parameter set. In some scenarios, the transmit parameter set is the same as receive parameter set and only one parameter set is configured. The parameter set may include one or more of time/frequency resource, transmission pattern, MCS, DMRS, etc. Each configuration contains a configuration index. The UE may transmit an SCI associated with the SL transmission data, and the configuration index is included in the SCI. This way, the SCI can be a reduced size, i.e. the difference in transmitting a complete configuration versus a configuration index, and does not need to convey time/frequency resource parameters or MCS, which can be configured as part of the configuration corresponding configuration index.

HARQ Parameters with or without SCI

In some scenarios, the GF transmission or configured grant transmission works without SCI. In some scenarios, a SCI format without indicating scheduling information (such as time/frequency MCS) may be useful. The SCI can include destination ID, optionally source ID, HARQ process ID, new data indicator (NDI), and RV. The reduced SCI format may not include time frequency resource, MCS, DMRS information, etc. If the UE decodes the SCI, the UE can obtain the destination ID and verify if the UE is target UE, which reduces the amount of blind detection of data. The source ID may be useful for HARQ feedback. The HARQ process ID, NDI, and RV can be used as part of the HARQ procedure.

On the other hand, if no SCI is available or a reduced SCI does not include HARQ information, the following mechanism may be used to determine HARQ process ID, NDI, and RV. The NDI and RV can be associated with the transmission pattern. The first location of the transmission pattern may correspond to a new transmission and one or more other location of the pattern may correspond to retransmission. If a flexible starting location is supported, the DMRS can indicate whether the transmission is a new transmission or a retransmission, i.e. to indicate NDI. The RV can be indicated using a configured RV sequence in the resource pool or a predefined RV sequence. Alternatively, the DMRS can be used to indicate the RV. The HARQ process ID can be determined based on a mapping between a time/frequency resource location and the HARQ process ID. The HARQ process ID may also depend on a periodicity of the resource or resource pattern. An example of determining a HARQ process ID would be HARQ process ID=(current slot number)/periodicity mod (maximum number of HARQ process). The maximum number of a HARQ process can be predefined or configured in the resource configuration.

SCI Indicating Slot Aggregation

In some embodiments, the SL transmission may allow the use of more than one slot for a single PSSCH transmission. This is sometimes called slot aggregation. The purpose of supporting slot aggregation is the possibility of using more time resource to transmit a large packet in one time. If slot aggregation is used for SL transmission and there is SCI associated with the SL data transmission, the SCI may be used to indicate the information about slot aggregation. For example, the SCI can indicate that slot aggregation is used, and the SCI may further indicate how many slots are used for the associated PSSCH transmission and may be the starting and/or ending slot for the slot aggregation.

Figure 5A:
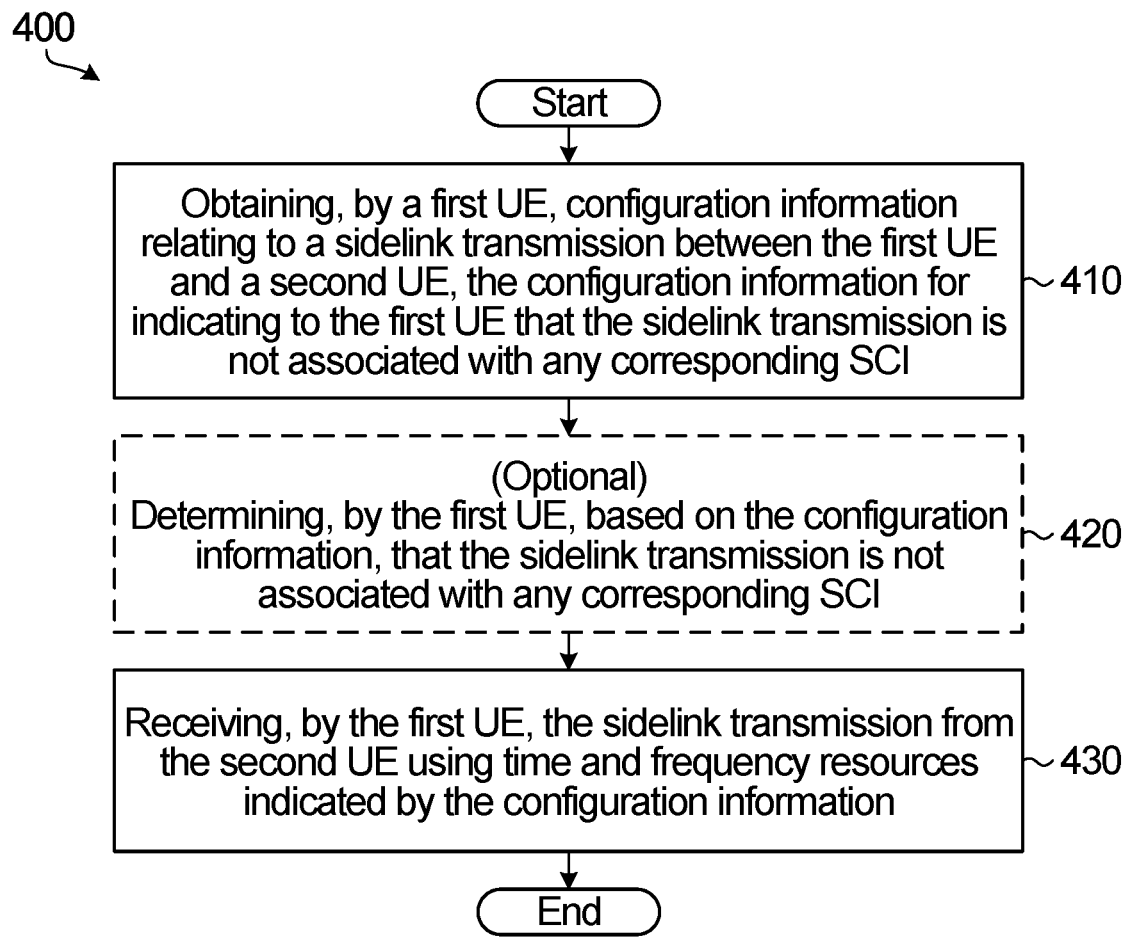
FIG. 5A is a first example flow chart describing a method according to an embodiment of the disclosure.

Referring now to FIG. 5A, shown is a flowchart of a method 400 of wireless communication provided by an embodiment of the invention. Any of the modifications, options, additional features described herein can be applied together with this method. The method 400 may, for example, be performed by one of the UE depicted in FIG. 9 or FIG. 10. The method 400 is described from the perspective of a receive UE. The method involves obtaining 410, by a first UE, configuration information relating to a sidelink transmission between the first UE and a second UE, the configuration information for indicating to the first UE that the sidelink transmission is not associated with any corresponding sidelink control information (SCI). Optionally, step 420 involves determining, by the first UE, based on the configuration information, that the sidelink transmission is not associated with any corresponding SCI. Step 430 involves receiving, by the first UE, the sidelink transmission from the second UE using time and frequency resources indicated by the configuration information. The SCI information is used for indicating transmission resource information for detecting and sensing the data transmission between the first UE and a second UE.

At step 420, the first UE may be able to determine if there is SCI with the data transmission in one of several ways based on the configuration information. For example, if the first UE is configured with configured grant, the first UE determining that there is no physical shared control channel (PSCCH) associated with the corresponding physical shared sidelink channel (PSSCH) data transmission. Alternatively, if the first UE is configured with a transmission pattern or a transmission pattern pool, the first UE determines that no SCI is associated with the data transmission. Another option may be, if the first UE is configured with a modulation and coding scheme (MCS) pool or a demodulation reference signal (DMRS) pool, the first UE determines that no SCI is associated with the data transmission. A further option may be, if the first UE is configured with an association of parameters, the first UE determines that no SCI is associated with the data transmission.

In the scenario of SL Mode 1, described herein as when a base station controls sidelink transmission between the first and second UEs, and the first UE is configured with configured grant, the configured grant resource is configured by the first UE receiving radio resource control (RRC) signaling.

In the scenario of SL Mode 2, described herein as when the second UE selects a resource from among a pool of potential resources for sidelink transmission between the first and second UEs, and the first UE is configured with configured grant, the configured grant resource is configured by the first UE receiving radio resource control (RRC) signaling or system information signaling.

The one or more configuration parameters with which the second UE is configured include transmission parameters such as: a transmission pattern; a demodulation reference signal (DMRS); a modulation and coding sequence (MCS); and a redundancy version (RV) sequence.

The one or more configuration parameters with which the first UE is configured include reception parameters that may be pools of parameters such as: a transmission pattern pool; a demodulation reference signal (DMRS) pool; a modulation and coding sequence (MCS) pool; and a redundancy version (RV) pool sequence.

The configuration parameters with which the first UE is configured may include an association of DMRS with other parameters such as: an association of DMRS with a transmission pattern; an association of DMRS with a MCS; and an association of DMRS with a RV sequence.

Figure 5B:
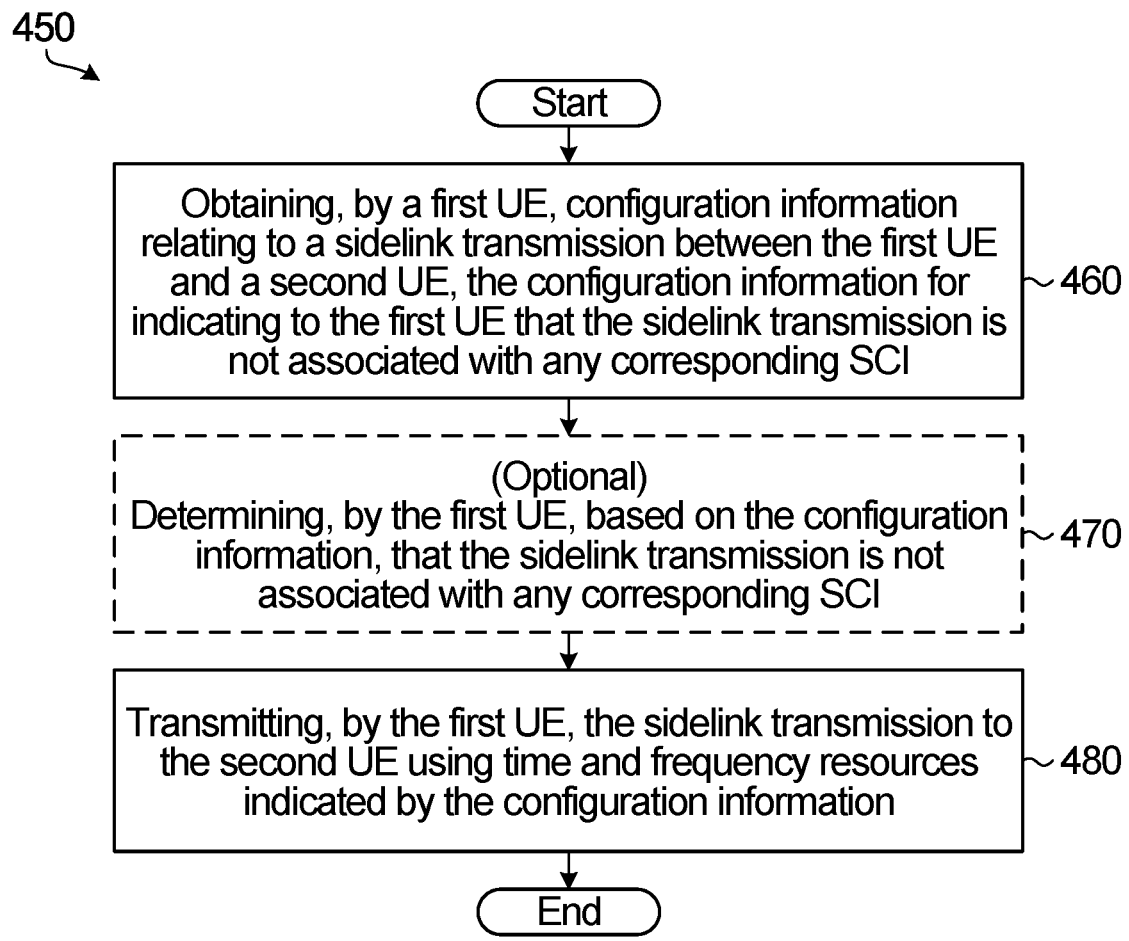
FIG. 5B is a second example flow chart describing a method according to an embodiment of the disclosure.
Figure 6A:
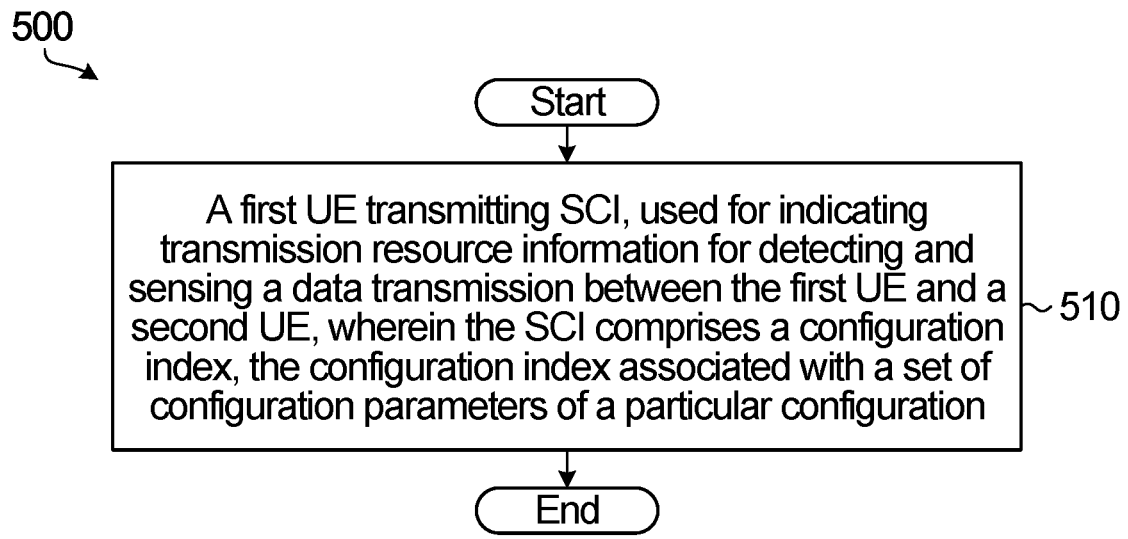
FIG. 6A is a third example flow chart describing a method according to an embodiment of the disclosure.

Referring now to FIG. 5B, shown is a flowchart of a method 450 of wireless communication provided by an embodiment of the invention. Any of the modifications, options, additional features described herein can be applied together with this method. The method 450 is described from the perspective of a transmit UE. The method 450 may, for example, be performed by one of the UE depicted in FIG. 9 or FIG. 10. The method involves obtaining 460, by a first UE, configuration information relating to a sidelink transmission between the first UE and a second UE, the configuration information for indicating to the first UE that the sidelink transmission is not associated with any corresponding SCI. Optional step 470 involves determining, by the first UE, based on the configuration information, that the sidelink transmission is not associated with any corresponding SCI. Step 480 involves transmitting, by the first UE, the sidelink transmission to the second UE using time and frequency resources indicated by the configuration information, Referring now to FIG. 6A, shown is a flowchart of a method 500 of wireless communication provided by an embodiment of the invention. Any of the modifications, options, additional features described herein can be applied together with this method. The method 500 may, for example, be performed by one of the UE depicted in FIG. 9 or FIG. 10. The method involves a first UE transmitting 510 SCI, used for indicating transmission resource information for detecting and sensing a data transmission between the first UE and a second UE, wherein the SCI comprises a configuration index, the configuration index associated with a set of configuration parameters of a particular configuration for use in defining the transmission resource information by the second UE.

Figure 6B:
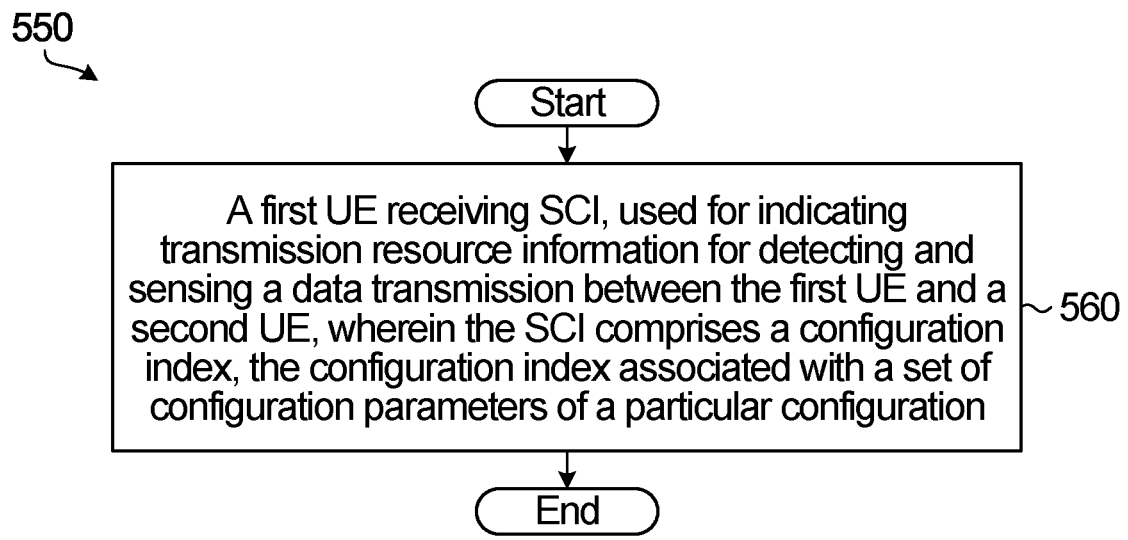
FIG. 6B is a fourth example flow chart describing a method according to an embodiment of the disclosure.

Referring now to FIG. 6B, shown is a flowchart of a method 550 of wireless communication provided by an embodiment of the invention. Any of the modifications, options, additional features described herein can be applied together with this method. The method 550 may, for example, be performed by one of the UE depicted in FIG. 9 or FIG. 10. The method involves a first UE receiving 560 SCI, used for indicating transmission resource information for detecting and sensing a data transmission between the first UE and a second UE, wherein the SCI comprises a configuration index, the configuration index associated with a set of configuration parameters of a particular configuration for use in defining the transmission resource information by the first UE.

DMRS to Indicate Priority

The DMRS of the SL data transmission can also be used to indicate priority of the SL data transmission. One typical way to indicate priority of data is to indicate priority in the SCI. However, if no SCI is associated with the SL data transmission, then the priority cannot be indicated in the SCI. Therefore, similar to the idea of using DMRS to indicate the transmission pattern or MCS as described above, a predefined or configured mapping of DMRS to different priority levels can be used. Priority can be used for a sensing purpose, where if a first UE detects the DMRS of transmission from a second UE and determines the priority of the SL data transmission from the second UE is higher than the priority of the data that the first UE intended to transmit, the first UE may avoid any potential collision with the SL data transmission of the second UE.

SL Configured Grant Transmission with RRC Configuration of the Receive UE

Configured grant transmission is supported in SL mode 1. In configured grant Type 1 transmission of SL Mode 1, the transmission resources are semi-statically configured by the BS in RRC signaling. The transmit UE is configured with UE specific transmission parameters for SL configured grant transmission, such as time and frequency resource, a transmission pattern, MCS, DMRS parameters, periodicity of resource, etc. If the target receive UE is known to the BS, the RRC configuration may further include a destination UE identifier (ID) or a destination group ID, i.e., the UE ID or group ID of the receive UE or UE group. The receive UE may also receive RRC signaling that configures the transmission parameters for the receive UE to receive the SL transmission from the transmit UE. The RRC configuration for the receive UE may include receive parameters, such as a time and frequency resource, a transmission pattern, MCS, DMRS parameters, periodicity of resource, etc. The parameters for the receive UE may match the parameters configured for the transmit UE so the receive UE can identify the parameters used for the transmission for decoding of the data. The RRC configuration for the receive UE may further include a source ID, which is the UE ID of the transmit UE. The transmit UE may perform SL transmission using the configured parameters at the configured time frequency locations. The receive UE knows the potential transmission resource used for the transmit UE and can therefore attempt to decode the data from transmit UE at the configured time/frequency location using the configured receive parameters. For this scheme, no SCI is associated with the SL data transmission. This is because using SCI to indicate transmission resource and parameter is not needed as the receive UE already knows the parameters used for the transmission from the RRC configuration. This scheme is most useful in a unicast and a groupcast scenario. This is because the receiver may be known by the BS in these scenarios.

Use of DMRS to Indicate Parameter Set from Set of Possible Parameter Sets or to Indicate Associated Value of a Parameter for Each of at Least One Parameter Pool In Example 2 above, a DMRS is transmitted to indicate a parameter set from a set of possible parameter sets. In Example 3 above, a DMRS is transmitted to indicate an associated value of the parameter for each of at least one transmit parameter pool. In some embodiments, to indicate the parameter set or associated value(s), the DMRS has a predefined or a configured mapping/association to the parameter sets or associated values. The association/mapping between the DMRS or DMRS parameters and the parameter set or associated values may be predefined. The association/mapping may also be configured to the UE through signaling (e.g. through RRC signaling, system information or preconfigured to the UE). With the mapping, if a UE detects a DMRS, the UE can then derive which parameter set or associated values the transmit UE is using.

The mapping that is used to associate the DMRS to specific parameter sets or associated value(s) may be based on one or a combination of DMRS sequences, different roots/initialization for the DMRS sequence, different cyclic shift values, DMRS time and frequency locations (e.g. different symbols), different orthogonal cover code used, different antenna ports, different code division multiplexing (CDM) groups, different DMRS patterns or some other aspect of the DMRS.

The DMRS is mainly used for channel estimation. An example of the DMRS can be the DMRS used in 3GPP NR uplink described in 3GPP TS 38.211 V15.0.0. Another example of the DMRS would be the UL DMRS used in LTE. In SL transmission, a similar DMRS structure as LTE or NR uplink may be used. The DMRS can be generated using a sequence, such as gold sequence (or m-sequence) or Zadoff Chu sequence. The sequence is usually calculated using a root or an initialization value. The sequence may be further applied with a phase shift (some time called a cyclic shift). For example, in LTE, a phase shift is applied to the Zadoff Chu sequence used for uplink DMRS, and the phase shift is usually called cyclic shift and can be indicated using a cyclic shift value or cyclic shift index. In LTE, the value of cyclic shift is indicated in the DCI as one of 8 possible choice of cyclic shift value using 3 bits.

The sequence may be further multiplied using orthogonal cover codes (OCC). The sequence may be further precoded and then mapped to time frequency resources and modulated to a reference signal and transmitted over the air. Orthogonal cover codes may include orthogonal cover codes applied to time domain or frequency domain. The DMRS sequence may be also applied to time frequency locations (e.g. in different resource elements) with different allocation patterns. The DMRS signal transmitted from the same time frequency resource may interfere with each other, therefore it is desirable to design different DMRS that can be multiplexed together with minimum interference to each other. This can be achieved by using DMRS sequences with low correlation among each other. Another way to achieve multiplexing of different DMRS is to use code division multiplexing (CDM), time division multiplexing (TDM) or frequency division multiplexing (FDM). Orthogonal cover codes are an example of CDM. Different allocation patterns (map DMRS sequence to different time frequency locations) to create different DMRS can be considered TDM or FDM. In some scenarios, the combination of different DMRS properties may be characterized by a single DMRS parameters, for example in new radio (NR) cellular system, different CDM, TDM, FDM patterns and different OCC used may be indicated using a single parameter as antenna port. The combination of DMRS sequence, different allocation patterns (TDM, FDM), different orthogonal cover codes used (different CDM pattern) and different DMRS locations together generates different DMRS.

The DMRS parameter may be known by the UE, if so then the UE can detect the DMRS without blind detection. In some cases, the exact DMRS parameter may not be known by the UE. In this case, the UE can blind decode the DMRS to find which DMRS and which DMRS parameters are used. There is usually a finite choice of DMRS parameters that are known to the UE. An example way to do DMRS detection is to use different choices of potential DMRS sequences to correlate with the DMRS at the potential location of DMRS and find which one gives the highest correlation by finding the output signal with the highest energy.

For example, in 4G LTE, a Zadoff-Chu (ZC) root sequence may be used to generate a pool of DMRS sequences generated according to the following formula $$X_{m,k}^{ZC} = e^{-j\pi q \frac{k(k+1)}{M_{ZC}}},$$

$0 \leq k \leq M_{ZC}$. Where $M_{\{zc\}}$ is the length of the root sequence, q is the index of the reference Zadoff-Chu sequence or the root of the sequence. The reference pilot sequence of given length is the cyclic extension of the original Zadoff-Chu sequence. The cyclic shift (phase rotation in frequency domain) of the reference sequence creates multiple orthogonal pilot sequences: $X_k = X_k^{ZC} e^{-j\alpha k}$, In LTE $\alpha = 2m\pi/12$, $m \in \{0, 1, \ldots, 11\}$. An orthogonal cover code may be applied to the two symbols used for DMRS for each subframe. In this scenario, the root q, cyclic shift value a, and the orthogonal cover codes used are all properties of the DMRS. And the UE can do DMRS detection and find out which root, which cyclic shift value and which orthogonal cover codes are used. And one or a combination of these properties (roots, cyclic shift and orthogonal cover codes) may be associated with the parameter set or associated value(s). After the receive UE detects the DMRS, the UE knows the parameter set or associated value(s) that the UE who transmitted the DMRS will use/is using for data based on the association between the DMRS and the parameter set or associated value(s).

In another example, in NR, if transform precoding for PUSCH is not enabled, the reference-signal sequence r(m) shall be generated according to $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is a defined by a length-31 Gold sequence and initialized using some given parameters. There are a limited number of Gold sequences that can be used to generate the DMRS. After precoding, the sequence is mapped to the time frequency resource using the following:

The UE shall map the sequence $\tilde{r}^{(p_j)}(m)$ to physical resource elements according to $$a_{k,l}^{(p_j,\mu)} = \beta_{DMRS} w_f(k') \cdot w_t(l') \cdot \tilde{r}^{(p_j)}(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

where $w_f(k')$, $w_t(l')$, and $\Delta$ are given by the specification defined in 3GPP TS 38.211, one of the example table for a configuration type is shown below.

TABLE 6.4.1.1.3-1

Parameters for PUSCH DM-RS configuration type 1.

| p | CDM group | $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

Here $\Delta$ value represents different DMRS time-frequency mapping patterns or different TDM/FDM schemes (FDM for this particular example where different value represents mapping to different subcarriers), which also corresponds to different CDM groups in this example. $w_f(k')$ and $w_t(l')$ are frequency domain and time domain orthogonal cover codes used. They are all determined using a single antenna port value p that can be indicated to the UE. The different Gold sequences, orthogonal cover codes (OCC), different mapping patterns together generate a different DMRS. And all the DMRS properties, such as different sequence, time and frequency domain OCC, CDM group, DMRS mapping pattern, antenna ports, DMRS locations (such as which DMRS symbols are used) and a combination of them may be used to associate with the parameter set or associated value(s). Again, there may be a limited number of DMRS choices and after the UE detects DMRS, the UE can find all the DMRS parameters and obtain the parameter set or associated value(s) using the known DMRS association with the parameter set or associated value(s).

In one example, the DMRS association with the parameter set or associated value(s) may be achieved through a fixed mapping between a DMRS index and a parameter set index or associated value(s) index. The DMRS index is an index among a pool of DMRS that can indicate a combination of one or multiple DMRS parameters/properties described earlier. The parameter set index can refer to a known parameter set within a plurality of sets of parameters or known associated value(s) defined within the parameter pools. For example, if there are 20 DMRS with indices p1, p2, ..., and p20 there can be a predefined mapping of p1 to parameter set 1, p2 to parameter set 2, etc. If there are 40 DMRS with indices p1, p2, ..., and p40, there can be a multiple DMRS to one parameter set mapping, e.g. p1 and p2 to parameter set 1, p3 and p4 to parameter set 2, ..., etc. For example, the DMRS may be mapped to the MCS if there are multiple choices of MCS. In this case, after the DMRS is detected, the MCS can be determined. An MCS pool may be signaled in the receive resource/resource pool or predefined. MCS pool may include a limited number of potential MCS that can be used for the transmission. In some embodiments, an MCS pool can be indicated as a set of possible indices in a predefined MCS table. Alternatively, the MCS can be obtained via blind detection among a small MCS pool. In an example, a UE may try all possible MCS among the MCS pool to decode data until successful.

In some embodiments, the DMRS is only used to indicate the transmission after the first transmission. In some embodiments, the pattern is defined/signaled where there is no overlap, in which case the DMRS may not even need to indicate the pattern. In some other embodiments, overlap between patterns is used, and the DMRS is used to differentiate potential patterns that share the first transmission resource.

The DMRS can be used to map to one or more pools of parameters. Alternatively, or in addition, the DMRS can be used to directly indicate a value of a parameter. For example, in some embodiments, the DMRS may be used to indicate a frequency hopping parameter. For example, if a pattern with two transmissions is defined with the location of a first transmission along with a frequency hopping offset (in terms of number of RBs or subchannels or PSSCH partitions), the DMRS can be used to map the hopping offset.

In another example, the RV may be directly indicated by the DMRS. Alternatively, the RV may be associated with the number of transmissions in the transmission pattern. The association may be using a predefined RV sequence or RV sequence signaled in the receive pool. In some embodiments, RV information may be included in the SCI, so a receive UE can obtain it after decoding the SCI. In some other embodiments, the SCI may include one or a combination of HARQ process ID and a new data indicator (NDI). The NDI indicates whether the transmission is a new initial transmission or a retransmission. In some embodiments, the DMRS may also be used to indicate HARQ process ID. In this scenario, the DMRS may be associated with HARQ process ID, so once a UE decodes the DMRS, it can find the HARQ process ID. In another embodiment, the DMRS may be used to indicate whether the transmission is an initial transmission or retransmission, or just used to indicate the NDI. For example, the initial transmission and retransmission may use different sets of DMRS.

After decoding the data, the UE can decode all other parameters that are not needed for decoding. For example, for the source ID, HARQ process ID, feedback channel location, more detailed destination ID, those can be included in the header or just embedded in a data transmission.

For the embodiments described, the SCI can be much more compact or not used at all, which saves overhead significantly. In addition, the reliability of decoding may be higher especially in the case of contention based transmission.

Sensing and Reservation for SL Transmission
Selection of Grant-Free Transmission Resource Based on Decoding of Sidelink Control Channel In some of the embodiments described herein, for the purpose of a UE to UE sidelink transmission, the transmit UE selects a transmission pattern to use for the transmission. In some embodiments, the transmission may be selected from pool of possible patterns configured via RRC configuration.

More generally, the transmit UE is aware of the pool of possible patterns before making the selection. For example, the pool could be pre-configured. More generally still, the transmit UE may be aware of transmission resources or a pool of SL transmission resources that can be selected for the purpose of sidelink transmission, referred to hereinafter as SL transmission resources. The pool of transmission patterns is one specific example of SL transmission resources.

In some embodiments, the resources that the UE can select between are configured based on a SL communication resource configuration. The SL communication resource configuration can be a pattern (one-dimensional, two-dimensional, also known as time-frequency repetition pattern, etc.), a pool of patterns, or a repetition number. For example, the SL communication resource configuration could be pre-configured. The configured/pre-configured SL communication resource configuration may be provided by a device manufacturer or a network operator (e.g., via a subscriber identity module). The SL communication resource configuration may be also provided by the network operator when a UE is in coverage of a base station so that the SL communication resource configuration is available wherever the UE may be, such as when the UE moves out of the network coverage.

In an embodiment of the invention, a transmit UE makes a selection of a SL transmission resource for the purpose of a sidelink transmission based on additional information obtained from decoding sidelink control channels. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmit UE will inform the receive UE of resources it is using for the sidelink transmission via a sidelink control channel (SCC). This can be, for example via previously described SCI, SA, using PSCCH, or some other mechanism. So, for every sidelink transmission, there is a corresponding resource indication on a corresponding sidelink control channel. Note that another UE may transmit an SCI some of the time even when it does not have SL data to transmit. This can also be decoded by the transmit UE and used to assist in making the selection of the SL transmission resource.

With this embodiment, a given transmit UE monitors the sidelink control channels of other UEs, and through such monitoring learns of the resources that are being used for sidelink transmissions of other UEs. For example, a UE that is part of a group of UEs may only monitor the SCI resources of other UEs in the group. Alternatively, a UE may monitor all SCI resources configured/pre-configured for the UE. Based on this information, the transmitting UE can make a more intelligent selection of resources for its own sidelink transmission. In some embodiments, the resources for the sidelink control channels are known to the UE. This necessitates that the control information be transmitted in a manner that allows UEs other than the receiver UE to decode it. For example, the control information can be transmitted in an open manner (readable by all UEs), or may be scrambled using a common ID known to a group of UEs.

The sidelink control information may indicate resources being used for a current sidelink transmission, and/or future sidelink transmissions. By monitoring the sidelink control information transmitted by other UEs, a transmit UE can learn which resources are being used for a current sidelink transmission (based on current sidelink control information that indicates resources being used for a current sidelink transmission), and/or the UE can learn which resources are being used for a current sidelink transmission based on previous sidelink control information that indicated resources being used for a future sidelink transmission that is aligned with the current transmission and/or the UE can learn which resources are being used for a current sidelink transmission based on previous sidelink control information that indicated resources being used for a future sidelink transmission that is not aligned with the current transmission.

Where the sidelink control information for another sidelink transmission indicates a pattern from a pool of patterns, or a resource from a pool of resources, the transmitting UE for a sidelink transmission can avoid selection of that particular pattern/resource. With this approach, collisions can be avoided, and performance can be improved.

An example of transmission pattern in a given time frequency grid is shown in FIG. 3, where the same VUE index in the figure represents a pattern and VUE index is the pattern index. In the example, there are 20 patterns that do not overlap with each other in such a 10 time slots×4 frequency partitions grid.

In one example, DMRS association with the pattern may be achieved through a fixed mapping between a DMRS index and a pattern index. The DMRS index is an index among a pool of DMRS that can indicate a combination of one or multiple DMRS parameters/properties described earlier. The pattern index can be a known pattern among a pattern pool. For example, if there are 20 DMRS with indices p1, p2 . . . , and p20 there can be a predefined mapping of p1 to pattern 1, p2 to pattern 2, etc. If there are 40 DMRS with indices p1, p2, . . . , and p40, there can be a multiple DMRS to one pattern mapping, e.g. p1 and p2 to pattern 1, p3 and p4 to pattern 2, . . . , etc.

In some embodiments, DMRS may have a fixed association/mapping with the transmission pattern or the time frequency location of the transmissions other than the first transmission of the TB. In some embodiments, DMRS may have a fixed association/mapping with the transmission pattern or the time frequency location of the transmissions other than the first transmission of the TB given the time frequency location of the first transmission of the TB is known.

For example, in some scenarios, the first transmission may already be known by the UE and the UE may only need to know the location of the rest of transmissions of the TB to do combining to decode the signal. The UE can know the first transmission through decoding of SCI, DMRS, which is associated with a data transmission. In this case, the DMRS may only need to map to the pattern of the remaining transmissions given the first transmission. In the pattern pool defined in FIG. 3, once the UE finds an initial transmission, the location of the second transmission is already determined, so detecting the DMRS may not even be needed to find the location of the second transmission.

Figure 7:
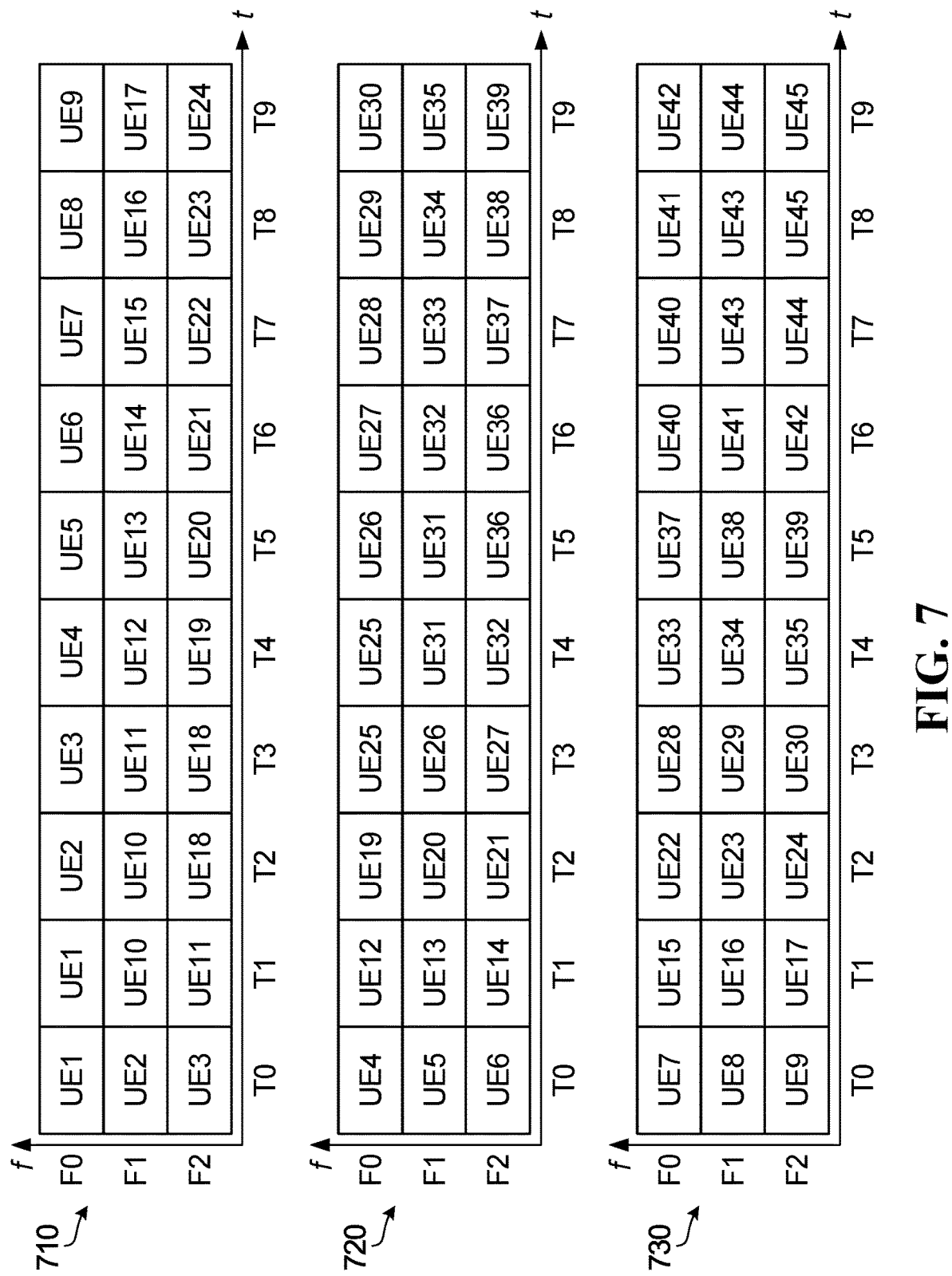
FIG. 7 is a specific example of three patterns in a partially overlapping TFRP pool.

In another example, the pattern pool is defined as in FIG. 7, where the patterns are partially overlapped with each other. In every time frequency resource, there are three possible patterns. In this case, if a UE finds a first transmission through decoding the SCI or DMRS, there may be three possibilities of transmission pattern or location of second transmission given the location of the first transmission. In this case, three DMRS or DMRS groups may be enough to indicate all possible transmission patterns. For example, the DMRS with index p1 or DMRS in group 1 may indicate or have a fixed association of patterns in the top grid 710 of FIG. 7. The DMRS with index p2 or DMRS in group 2 may indicate or have a fixed association of patterns in the middle grid 720 of FIG. 7. The DMRS with index p3 or DMRS in group 3 may indicate or have a fixed association of patterns in the bottom grid 730 of FIG. 7.

After obtaining the pattern information through DMRS mapping, the UE can combine the signal from different transmissions through pattern information to decode the signal. This is most useful in the case where the signal is targeting to the UE. If the signal is not targeting the UE, the UE may use the pattern information to avoid collision with the UE who sent the DMRS or pattern indication signal.

In some embodiments, a single pattern can be mapped to multiple DMRS, so a UE may use different DMRS even if the UE uses the same pattern. The mapping between the DMRS and the pattern may be predefined or configured by the base station or the network.

In some embodiments, a UE is preconfigured/-configured/predefined with a DMRS pool and the UE randomly selects a DMRS from the DMRS pool. Alternatively, a UE may be configured/preconfigured with a specific DMRS. A DMRS pool/specific DMRS may be defined among the DMRS mapped to the same pattern that is to be indicated using the DMRS.

When multiple DMRS are mapped to the same transmission pattern, to indicate a given transmission pattern, a UE may randomly select the DMRS among the DMRS that can mapped to the pattern.

In some embodiments, a UE also uses multiple transmissions of the same DMRS or a DMRS tuple (a number of DMRS used for multiple transmission/repetitions) for repetition identification for soft combining. For example, repetition of the same transport block (TB) may use the same DMRS or a predefined configured DMRS tuple. DMRS may also be used to indicate redundancy version (RV). So once a UE detects the DMRS, the UE also knows how to combine the repetitions.

An example of DMRS tuple associated with retransmission is shown in FIG. 8, where P11, P21, . . . , and P33 are DMRS indices. If a UE detects a P11 DMRS, P21 DMRS, P31 DMRS at different time/frequency locations, the UE knows that the DMRS corresponds to the initial transmission, $1^{st}$ retransmission or repetition of the TB, $2^{nd}$ retransmission or repetition of the same TB and can combine all three transmissions to decode the data signal in sidelink transmission.

In some embodiments, the signal that is used to indicate the transmission pattern is transmitted contemporaneously with the data transmission. For example, the DMRS may be transmitted at the same time or in the same slot as the data transmission. In other embodiments, the signal that is used to indicate the transmission pattern is transmitted in advance to indicate the transmission pattern. An advance indication signal may be transmitted before the signal transmission occurs, so other UEs may detect the indication signal and use it to avoid a conflict. An advance indication signal can be a preamble, a sequence, a RS, a reservation signal, a dedicated transmission pattern indication signal to name a few specific examples. In some embodiments, the advanced indication signal may be considered a control signal.

Advantages of using DMRS to indicate transmission pattern includes at least:
- A reduction in overhead: Depending on the total number of patterns, transmitting the transmission pattern information in the SCI may use significant overhead for reliable transmission of SCI. Using DMRS to indicate the pattern can reduce the overhead;
- Reliability: Also DMRS may be more reliable and can be easily detected even if there are two UEs using the same resource; and
- Other UEs can quickly decode DMRS to obtain the pattern information.

Transmission Pattern Selection

Some embodiments of the disclosure provide methods of selecting a transmission pattern for a sidelink transmission, when the UE has the freedom to select between multiple transmission patterns. The methods include steps of configuring transmission patterns, initialization/pattern selection, pattern indication, and sensing transmission patterns used by other UEs so as to enable the UE to avoid selecting a transmission pattern that is already being used.

Configuration: a UE may have a default transmission pattern or be configured with an initial transmission pattern. A UE may be additionally configured/preconfigured with a transmission pattern pool. The configuration parameters may include one or more of: periodicity, pattern window length, repetition number, time-frequency size of each transmission, and/or other configuration parameters. Periodicity is the periodicity of the resources configured for the UE. Pattern window length is a length of windows for patterns transmitted within one transport block (TB), an example of pattern window length is the time between T0 to T4 or 5 slots as shown in FIG. 3. Repetition number is the number of repetitions/transmission for each TB. Time frequency size is the size of time frequency resources, e.g. number of slots, RBs or subchannels used for one SL data transmission.

Initialization: a UE may use a default or configured initial transmission pattern as a first selected transmission pattern. Alternatively, if a UE is not configured with an initial pattern, the UE may be randomly select a transmission pattern among pattern pool.

Pattern indication: When the UE transmits a sidelink data signal using the selected transmission pattern, the UE may also indicate the pattern, using any of the previously described methods. The indication may be transmitted during the data transmission (e.g. DMRS) or in advance. Alternatively, for this embodiment, the pattern may be indicated in an SCI. Apart from indicating the transmission pattern, the SCI may include the general time-frequency resource of the transmission, the indication may further include one or more of periodicity information and reservation (e.g. m TBs to be transmitted in burst) and a priority value. In some other embodiments, the SCI may not include a time-frequency resource or any scheduling information such as MCS for the SL data transmission. The m TBs refers to that the UE plans to transmit m times or m TBs in m resources so that any two neighbor resources are spaced apart by a time distance defined by a periodicity. Each of the m resources for m TBs may include more than 1 transmission of the TB and therefore can have more than 1 resource. The UE may decide to transmit m times and indicate the multiple transmissions because the packets in the buffer may need to be transmitted m times. The priority value indicates how important the transmission with respect to other UEs transmissions is.

Sensing: Various sensing procedures are provided. In some embodiments, a UE may perform measurement through reference signal received power (RSRP) of data signal, DMRS or SCI, received signal strength indication (RSSI) of data signal, DMRS or SCI or through detection of DMRS sequences, or energy to determine the approximate usage at different possible transmit resources. Based on these measurements, the UE selects a transmission pattern for sidelink transmission. For example, if for one transmission pattern, there is too much transmission or too high an amount of energy detected, the UE may select a different transmission pattern.

In some embodiments, a UE detects the transmission pattern indication signal (DMRS/preamble/advanced indication signal) or detects an SCI to obtain an indication of the transmission patterns used by other UEs. The UE may also obtain one or more of periodicity, m reservation and priority information if included in the transmission pattern indication signal and/or SCI. If the UE has selected a transmission pattern that collides with one of the patterns determined from the transmission pattern indication signal or SCI, the UE may re-select a pattern among the remaining patterns in the pattern pool.

Note that for sensing, a UE may monitor/detect the indication signal in different windows.

In some embodiments, the UE is configured to avoid all the transmission patterns it detected within a predefined sensing period. This may be used with or without a condition that the priority of the detected UE is higher than the priority assigned to the UE itself. An example is that the UE detects an indication (e.g. through SCI or DMRS detection) that the transmitting UE plans to transmit m times with periodicity P1, the UE may consider any resources located in t+P1*n, where t is the current time, n is the integer between 1 and m. A potential resource that is used by the transmitting UE therefore may collide, if the UEs use the same resource. In another embodiment, if a UE B detects a pattern used by UE A through any of the methods described within a predefined time window before transmission, even if UE A does not reserve another m resources, UE B may assume UE A may keep using the same pattern and therefore try to avoid using the same pattern in a certain number of subsequent transmissions. Alternatively, UE A may only avoid such potential collision if UE B indicates a higher priority than UE A's transmission priority, which may be predefined or configured or simply known by the UE.

In some embodiments, the UE performs short term sensing immediately before the transmission and determines whether it should perform the transmission or delay the transmission.

For any of the embodiments described above, if changing the transmission pattern can avoid collision, UE may change the pattern. Otherwise, UE may use the same selected pattern for the next transmission.

Apparatus Descriptions

Figure 9:
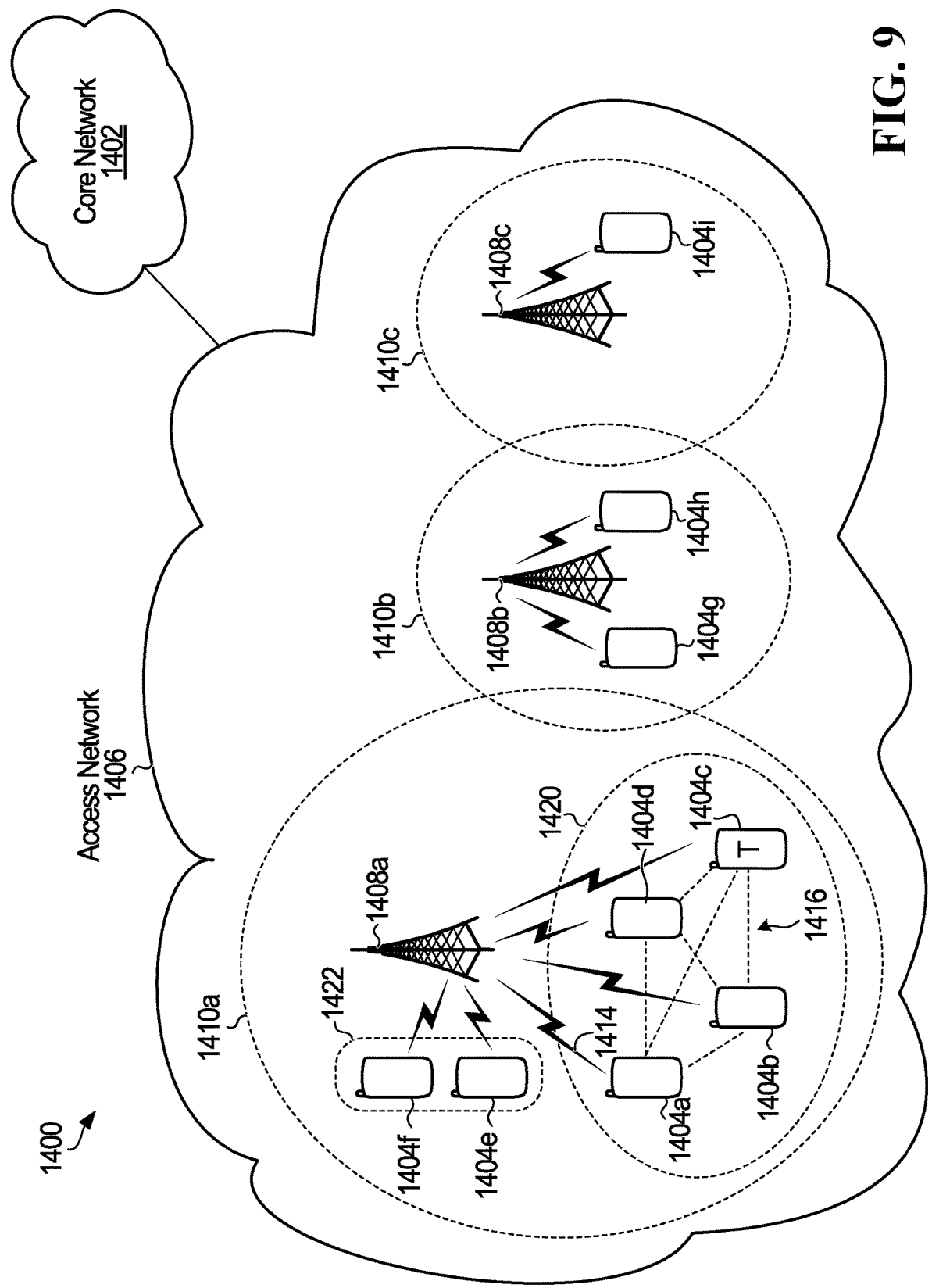
FIG. 9 is a block diagram illustrating an example of a telecommunications network according to one embodiment.

FIG. 9 is a block diagram illustrating an example of a telecommunications network 1400 according to one embodiment, for implementing any one or combination of two or more of the above described methods. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c.

The BSs 1408a-c each provide a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. Although the UEs 1404a-d can each wirelessly communicate with the BS 1408a, they can also directly communicate with each other, as represented at 1416. The communications represented at 1416 are direct communications between UEs that do not go through an access network component, such as a BS. As shown in FIG. 9, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and WiFi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE. In the examples above, UE 1404c is being assisted and so is the TUE 1404c. The other UEs 1404a, 1404b, and 1404d in the group 1420 form a cooperation candidate set, which is a set of UEs that may cooperate to help the TUE 1404c. The subset of UEs in the cooperation candidate set that actually assist the target UE 1404c form a cooperation active set. The cooperation active set may be dynamically selected to assist the target UE 1404c. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908a and members of the UE group 1420.

There may be more than one UE group. For example, UEs 1404e and 1404f in FIG. 9 form another UE group 1422.

Figure 10:
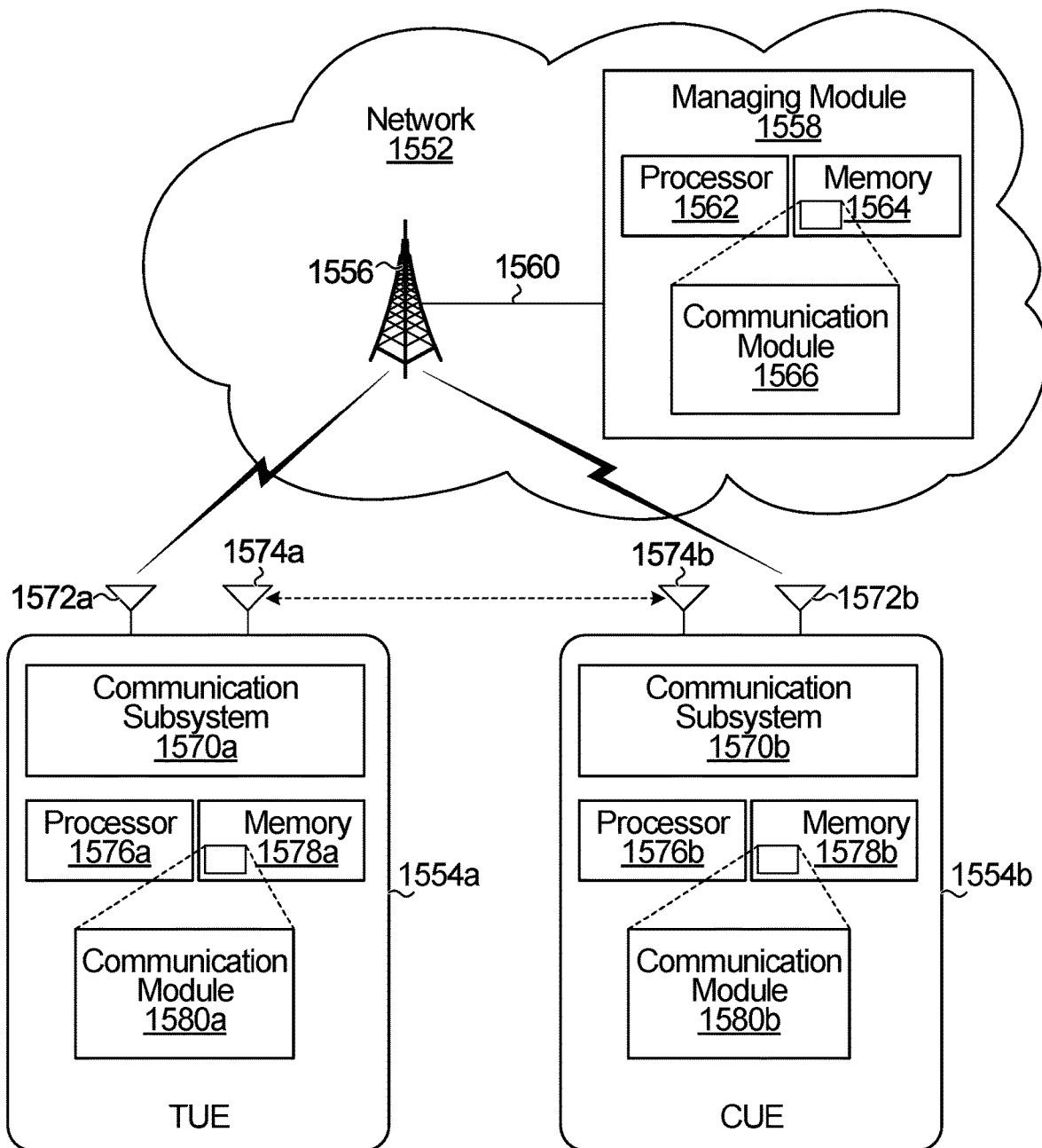
FIG. 10 is a block diagram illustrating an example of a network serving two user equipment (UEs).

FIG. 10 is a block diagram illustrating an example of a network 1552 serving two UEs 1554a and 1554b, according to one embodiment. The network 1552 may be the access network 1406 from FIG. 9, and the two UEs 1554a and 1554b may be two of the four UEs 1404a-d in FIG. 9, or the UEs 1554a and 1554b may be UEs 1404e and 1404f in FIG. 9. However, more generally this need not be the case, which is why different reference numerals are used in FIG. 10.

The network 1552 includes a BS 1556 and a managing module 1558. The managing module 1558 instructs the BS 856 to perform actions. The managing module 1558 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module

1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used.

Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574a may be a Bluetooth™ antenna. SL communications could also or instead be over licensed or unlicensed spectrum.

The UE 1554b includes the same components described above with respect to the UE 1554a. That is, UE 1554b includes communication subsystem 1570b, antennas 1572b and 1574b, processor 1576b, memory 1578b, and communication module 1580b.

The UE 1554a is designated as a target UE (TUE) and will therefore be called TUE 1554a. The UE 1554b is a cooperating UE and will therefore be called CUE 1554b. The CUE 1554b may be able to assist with wireless communications between the BS 1556 and TUE 1554a if a UE group were to be established that included TUE 1554a and CUE 1554b. Other communication scenarios are also contemplated, in a V2X application, for example.

UE 1554a may be specifically chosen as the target UE by the network 1552. Alternatively, the UE 1554a may itself determine that it wants to be a target UE and inform the network 1552 by sending a message to the BS 1556. Example reasons why UE 1554a may choose or be selected by the network 1552 to be a target UE include: low wireless channel quality between the UE 1554a and the BS 1556, many packets to be communicated between the BS 1556 and the UE 1554a, and/or the presence of a cooperating UE that is a good candidate for helping with communications between the BS 1556 and the UE 1554a.

UE 1554a need not always stay a target UE. For example, UE 1554a may lose its status as a target UE once there is no longer a need or desire for assistance with wireless communications between UE 1554a and the BS 1556. UE 1554a may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554a acts only as a target UE, i.e., TUE 1554a, and the UE 1554b is a cooperating UE to the TUE 1554a, i.e., CUE 1554b.

FIGS. 9 and 10 illustrate systems in which embodiments could be implemented. In some embodiments, a UE includes a processor, such as 1576a, 1576b in FIG. 10, and a non-transitory computer readable storage medium, such as 1578a, 1578b in FIG. 10, storing programming for execution by the processor. A non-transitory computer readable storage medium could also or instead be provided separately, as a computer program product.

Further details of other options are described in Applicant's Application Nos. 62/791,722 filed Jan. 11, 2019, 62/755,392 filed Nov. 2, 2018 and 62/795,000 filed Jan. 21, 2019, all of which are hereby incorporated by reference in their entirety.

In a particular embodiment, in sidelink resource allocation mode 1:

for physical sidelink shared channel (PSSCH) and physical sidelink control channel (PSCCH) transmission, dynamic grant, configured grant type 1 and configured grant type 2 are supported.

PSSCH transmission(s) can be dynamically scheduled by a sidelink grant in a DCI, or the transmission can correspond to a configured grant Type 1 or Type 2. The configured grant Type 1 PSSCH transmission is semi-statically configured to operate upon the reception of higher layer parameter of SL-ConfiguredGrantConfig including rrc-Con figuredSidelinkGrant without the detection of a sidelink grant in a DCI. The configured grant Type 2 PSSCH transmission is semi-persistently scheduled by a sidelink grant in a valid activation DCI after the reception of higher layer parameter SL-ConfiguredGrantConfig not including rrc-ConfiguredSidelinkGrant."

In a particular embodiment, the configuration of SL configured grant Type-1 resource includes at least higher layer parameters timeDomainOffset and periodicity, where periodicity is the periodicity of configured grant resources and timeDomainOffset is slot number of a starting configured grant resource of a period of configured grant (CG) with respect to a referece point, where the reference point can be the system frame number (SFN)=0. The time location of the sidelink slot for configured grant Type 1 can be determined as follows:

After one sidelink configued grant type-1 is configured by the higher layer parameters SL-configuredGrantConfig, the transmssion is recurred with each Uu slot slot as follows:

(numberOfSlotsPerFrame×SFN+slot number in the frame)=(timeDomainOffset+$N$×periodicity×numberOfSlotsPerFrame/10) modulo (1024×numberOfSlotsPerFrame), for all $N$>=0.

where "numberOfSlotsPerFrame×SFN+slot number in the frame" is the starting slot index for each period of the configured grant, numberOfSlotsPerFrame refers to the number of consecutive slots per frame as specified in TS 38.211 [1], timeDomainOffset and periodicity are provided by higher layer parameters sl-PeriodCG and sl-TimeOffsetCG-Type1, respectively, which are described earlier and N is an integer. For each corresponding starting Uu slot index corresponding to N, the SL slots of the configured grant is the first SL slot of the resource pool that starts not earlier than $$T_{DL\_CG} - \frac{T_{TA}}{2} \times T_C,$$

where $T_{DL\_CG}$ is the starting time of the downlink slot corresponding to the N-th starting Uu slot index, $T_{TA}$ is the timing advance (TA) value at the time of the corresponding downlink Uu slot, and $T_c$ is the unit for the TA value, as defined in 38.211.

According to a first example of the present disclosure there is provided a method for wireless communication, the method involving: obtaining, by a first user equipment (UE), configuration information relating to a sidelink transmission between the first UE and a second UE, the configuration information for indicating to the first UE that the sidelink transmission is not associated with any corresponding sidelink control information (SCI); and receiving, by the first UE, the sidelink transmission from the second UE using time and frequency resources indicated by the configuration information.

In some embodiments, the method further involves determining, by the first UE, based on the configuration information, that the sidelink transmission is not associated with any corresponding SCI.

In some embodiments, the configuration information comprises an indication that the sidelink transmission is a configured grant transmission.

In some embodiments, the configuration information comprises an indication of a transmission pattern or a transmission pattern pool.

In some embodiments, the configuration information comprises an indication of a modulation and coding scheme (MCS) pool or a demodulation reference signal (DMRS) pool.

In some embodiments, the configuration information comprises an association of parameters related to the sidelink transmission.

In some embodiments, the first UE receives an identification of the time and frequency resources indicated by the configuration information from a base station.

In some embodiments, the first UE receives an identification of the time and frequency resources in a time-frequency resource pool indicated by the configuration information from a base station.

According to a second example of the present disclosure there is provided a method for wireless communication, the method involving: obtaining, by a first user equipment (UE), configuration information relating to a sidelink transmission between the first UE and a second UE, the configuration information for indicating to the first UE that the sidelink transmission is not associated with any corresponding sidelink control information (SCI); and transmitting, by the first UE, the sidelink transmission to the second UE using time and frequency resources indicated by the configuration information.

In some embodiments, the method further involves determining, by the first UE, based on the configuration information, that the sidelink transmission is not associated with any corresponding SCI.

In some embodiments, the configuration information comprises an indication that the sidelink transmission is a configured grant transmission.

In some embodiments, the configuration information comprises an indication of a transmission pattern or a transmission pattern pool.

In some embodiments, the configuration information comprises an indication of a modulation and coding scheme (MCS) pool or a demodulation reference signal (DMRS) pool.

In some embodiments, the configuration information comprises an association of parameters related to the sidelink transmission.

In some embodiments, the first UE receives an identification of the time and frequency resources indicated by the configuration information from a base station.

In some embodiments, the first UE receives an identification of the time and frequency resources in a time-frequency resource pool indicated by the configuration information from a base station.

In some embodiments, the method further involves selecting the time and frequency resources for the sidelink transmission from the time-frequency resource pool.

In some embodiments, the time and frequency resources are selected based on a sensing procedure.

According to a third example of the present disclosure there is provided a method for wireless communication, the method involving: a first user equipment (UE) receiving sidelink control information (SCI), used for indicating transmission resource information for detecting and sensing a data transmission between the first UE and a second UE, wherein the SCI comprises a configuration index, the configuration index associated with a set of configuration parameters of a particular configuration for use in defining the transmission resource information by the first UE.

In some embodiments, the set of configuration parameters associated with the configuration index comprises one or more of: a transmission pattern; a demodulation reference signal (DMRS); a modulation and coding sequence (MCS); and a redundancy version (RV) sequence.

In some embodiments, the transmission pattern is a transmission pattern of a pool of transmission patterns known to the first UE; the DMRS is a DMRS of a pool of DMRS known to the first UE; the MCS is a MCS of a pool of MCS known to the first UE; and the RV sequence is a RV of a pool of RV sequences known to the first UE.

In some embodiments, the set of configuration parameters associated with the configuration index comprises one or more of: a destination identifier (ID); a source ID; a hybrid automatic repeat request (HARQ) process ID; and a new data indicator (NDI).

In some embodiments, the set of configuration parameters associated with the configuration index comprises information defining at least one of: an association between a transmission part and one or both of a new data indicator (NDI) and a redundancy version (RV) sequence; and an association between the DMRS and a RV sequence; an association between a time/frequency resource location and a hybrid automatic repeat request (HARQ) process identifier (ID); and a hybrid automatic repeat request (HARQ) process ID may also depends on the periodicity.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
receiving, by a first user equipment (UE) from a base station, configuration information, the configuration information comprising a plurality of sets of configuration parameters for sidelink (SL) data transmissions with at least one other UE, each set of the plurality of sets of configuration parameters having a corresponding configuration index that corresponds to an SL grant-free (GF) resource configuration;
transmitting, by the first UE to a second UE, sidelink control information (SCI) used for indicating transmission resource information for scheduling a SL data transmission from the first UE to the second UE, wherein the SCI comprises a first configuration index identifying a first set of configuration parameters of the plurality of sets of configuration parameters for the SL data transmission, wherein the first configuration index in the SCI corresponds to a first SL GF resource configuration, and wherein the first set of configuration parameters corresponding to the SL first GF resource configuration includes a frequency resource, a periodicity, a number of hybrid automatic repeat request (HARQ) processes, and feedback channel parameters; and
transmitting, by the first UE to the second UE, the SL data transmission.

2. The method of claim 1, wherein the transmitting the SL data transmission to the second UE further includes:
transmitting the SL data transmission according to the first set of configuration parameters identified by the first configuration index.

3. The method of claim 1, wherein the each set of the plurality of sets of configuration parameters identified by the corresponding configuration index comprises a time resource information and a frequency resource information, and
wherein the transmitting the SL data transmission to the second UE further includes:
transmitting the SL data according to the time resource information and the frequency resource information.

4. The method of claim 1, wherein the first set of configuration parameters corresponding to the SL first GF resource configuration further includes at least one of:
a transmission pattern or a pool of transmission patterns,
a pattern window size,
frequency hopping parameters,
repetition K,
a demodulation reference signal (DMRS) or a pool of DMRSs,
a modulation and coding sequence (MCS) or a pool of MCSs,
a redundancy version (RV) sequence or a pool or RVs,
a destination identifier (ID),
a source ID,
an HARQ process ID, or
a new data indicator (NDI).

5. The method of claim 1, further comprising: transmitting, by the first UE to a third UE, for sensing the SCI used for indicating the transmission resource information for scheduling the SL data transmission from the first UE to the second UE.

6. The method of claim 1, further comprising:
selecting, by the first UE, the first set of configuration parameters from the plurality of sets of configuration parameters for indicating the transmission resource information for scheduling the SL data transmission from the first UE to the second UE.

7. A user equipment (UE) comprising:
at least one processor;
a non-transitory computer-readable medium having stored thereon, computer-executable instructions, that when executed by the at least one processor, cause the UE to perform operations comprising:
receiving, from a base station, configuration information, the configuration information comprising a plurality of sets of configuration parameters for sidelink (SL) data transmissions with at least one other UE, each set of the plurality of sets of configuration parameters having a corresponding configuration index that corresponds to an SL grant-free (GF) resource configuration;
transmitting, to a second UE, sidelink control information (SCI) used for indicating transmission resource information for scheduling a SL data transmission from the UE to the second UE, wherein the SCI comprises a first configuration index identifying a first set of configuration parameters of the plurality of sets of configuration parameters for the SL data transmission, wherein the first configuration index in the SCI corresponds to a first GF SL resource configuration, and wherein the first set of configuration parameters corresponding to the SL first GF resource configuration includes a frequency resource, a periodicity, a number of hybrid automatic repeat request (HARQ) processes, and feedback channel parameters; and
transmitting, to the second UE, the SL data transmission.

8. The UE of claim 7, wherein the transmitting the SL data transmission to the second UE includes:
transmitting the SL data transmission according to the first set of configuration parameters identified by the first configuration index.

9. The UE of claim 7, wherein the each set of the plurality of sets of configuration parameters identified by the corresponding configuration index comprises a time resource information and a frequency resource information, and
wherein the transmitting the SL data transmission to the second UE further includes:
transmitting the SL data according to the time resource information and the frequency resource information.

10. The UE of claim 7, wherein the first set of configuration parameters corresponding to the first SL GF resource configuration further includes at least one of:
a transmission pattern or a pool of transmission patterns,
a pattern window size,
frequency hopping parameters,
repetition K,
a demodulation reference signal (DMRS) or a pool of DMRSs,
a modulation and coding sequence (MCS) or a pool of MCSs,
a redundancy version (RV) sequence or a pool or RVs,
a destination identifier (ID),
a source ID,
an HARQ process ID, or
a new data indicator (NDI).

11. The UE of claim 7, the operations further comprising:
transmitting, to a third UE, for sensing the SCI used for indicating the transmission resource information for scheduling the SL data transmission from the UE to the second UE.

12. The UE of claim 7, the operations further comprising:
selecting the first set of configuration parameters from the plurality of sets of configuration parameters for indicating the transmission resource information for scheduling the SL data transmission from the UE to the second UE.

13. A method comprising:
receiving, by a first user equipment (UE) from a base station, configuration information, the configuration information comprising a plurality of sets of configuration parameters for sidelink (SL) data transmissions between at least two UEs, each set of the plurality of sets of configuration parameters having a corresponding configuration index that corresponds to an SL grant-free (GF) resource configuration;
receiving, by the first UE from a second UE, sidelink control information (SCI) used for indicating transmission resource information for scheduling a SL data transmission from the second UE, wherein the SCI comprises a first configuration index identifying a first set of configuration parameters of the plurality of sets of configuration parameters for the SL data transmission, wherein the first configuration index in the SCI corresponds to a first SL GF resource configuration, and wherein the first set of configuration parameters corresponding to the SL first GF resource configuration includes a frequency resource, a periodicity, a number of hybrid automatic repeat request (HARQ) processes, and feedback channel parameters;
decoding, by the first UE, the SCI; and
determining, by the first UE, a location in a transmission resource where the SL data transmission is transmitted by the second UE based on the SCI decoded by the first UE.

14. The method of claim 13, wherein the determining the location in the transmission resource where the SL data transmission is transmitted by the second UE based on the SCI decoded by the first UE comprises:
determining the location according to the first set of configuration parameters identified by the first configuration index.

15. The method of claim 13, wherein the each set of the plurality of sets of configuration parameters identified by the corresponding configuration index comprises a time resource information and a frequency resource information, and
wherein the receiving the SL data transmission from the second UE further includes:
receiving the SL data according to the time resource information and the frequency resource information.

16. The method of claim 13, wherein the first set of configuration parameters corresponding to the first SL GF resource configuration further includes at least one of:
a transmission pattern or a pool of transmission patterns,
a pattern window size,
frequency hopping parameters,
repetition K,
a demodulation reference signal (DMRS) or a pool of DMRSs,
a modulation and coding sequence (MCS) or a pool of MCSs,
a redundancy version (RV) sequence or a pool of RVs,
a destination identifier (ID),
a source ID,
an HARQ process ID, or
a new data indicator (NDI).

17. The method of claim 13, further comprising:
when the first UE determines the SL data transmission is intended for the first UE, decoding, by the first UE, the SL data transmission received from the second UE based on information in the SCI decoded by the first UE.

18. The method of claim 13, further comprising:
selecting, by the first UE, a second transmission resource different than the transmission resource identified by the SCI decoded by the first UE for communication between the first UE and a third UE.

19. A user equipment (UE) comprising:
at least one processor;
a non-transitory computer-readable medium having stored thereon, computer-executable instructions, that when executed by the at least one processor, cause the UE to perform operations comprising:
receiving, from a base station, configuration information, the configuration information comprising a plurality of sets of configuration parameters for sidelink (SL) data transmissions between at least two UEs, each set of the plurality of sets of configuration parameters having a corresponding configuration index that corresponds to an SL grant-free (GF) resource configuration;
receiving, from a second UE, sidelink control information (SCI) used for indicating transmission resource information for scheduling a SL data transmission from the second UE, wherein the SCI comprises a first configuration index identifying a first set of configuration parameters of the plurality of sets of configuration parameters for the SL data transmission, wherein the first configuration index in the SCI corresponds to a first SL GF resource configuration, and wherein the first set of configuration parameters corresponding to the SL first GF resource configuration includes a frequency resource, a periodicity, a number of hybrid automatic repeat request (HARQ) processes, and feedback channel parameters;
decoding the SCI; and
determining a location in a transmission resource where the SL data transmission is transmitted by the second UE based on the SCI decoded by the UE.

20. The UE of claim 19, wherein the determining the location in the transmission resource where the SL data transmission is transmitted by the second UE based on the SCI decoded by the UE comprises:
determining the location according to the first set of configuration parameters identified by the first configuration index.

21. The UE of claim 19, wherein the each set of the plurality of sets of configuration parameters identified by the corresponding configuration index comprises a time resource information and a frequency resource information, and
wherein the receiving the SL data transmission from the second UE further includes:
receiving the SL data according to the time resource information and the frequency resource information.

22. The UE of claim 19, wherein the first set of configuration parameters corresponding to the first SL GF resource configuration includes at least one of:
a transmission pattern or a pool of transmission patterns,
a pattern window size,
frequency hopping parameters,
repetition K,
a demodulation reference signal (DMRS) or a pool of DMRSs, a modulation and coding sequence (MCS) or a pool of MCSs, a redundancy version (RV) sequence or a pool of RVs, a destination identifier (ID), a source ID, an HARQ process ID, or a new data indicator (NDI).

23. The UE of claim 19, the operations further comprising:
- when the UE determines the SL data transmission is intended for the UE, decode the SL data transmission received from the second UE based on the SCI decoded by the UE.

24. The UE of claim 19, the operations further comprising:
- select a second transmission resource different than the transmission resource identified by the SCI decoded by the UE for communication between the UE and a third UE.

25. The method of claim 1, wherein the SCI indicate slot aggregation.

26. The method of claim 1, wherein the second UE receives second configuration information comprising the plurality of sets of configuration parameters, and wherein the second UE determines a location in a transmission resource where the SL data transmission is transmitted by the first UE based on the first configuration index and the plurality of sets of configuration parameters.

27. The method of claim 1, wherein the first UE transmits the SCI based on determining:
- that the first UE is not configured with a transmission pattern, a pool of transmission patterns, an MCS, or a pool of MCSs,
- that the first UE is not configured with an association of parameters,
- that the first UE is configured with an SCI resource, or
- that the first UE is not configured with quality of service (QoS).

* * * * *